US011828616B2

(12) United States Patent
Yoshikawa et al.

(10) Patent No.: US 11,828,616 B2
(45) Date of Patent: Nov. 28, 2023

(54) SEARCH SYSTEM, SEARCH METHOD, AND RECORDING MEDIUM FOR RECORDING SEARCH PROGRAM

(71) Applicant: MICWARE CO., LTD., Kobe (JP)

(72) Inventors: Sumito Yoshikawa, Kobe (JP); Michihiro Nishida, Kobe (JP)

(73) Assignee: MICWARE CO., LTD., Kobe (JP)

( * ) Notice: Subject to any disclaimer, the term of this patent is extended or adjusted under 35 U.S.C. 154(b) by 329 days.

(21) Appl. No.: 16/920,013

(22) Filed: Jul. 2, 2020

(65) Prior Publication Data

US 2021/0003417 A1      Jan. 7, 2021

(30) Foreign Application Priority Data

Jul. 3, 2019  (JP) .................................. 2019-124091
Jun. 30, 2020 (JP) .................................. 2020-113490

(51) Int. Cl.
*G01C 21/36* (2006.01)
*G06F 16/909* (2019.01)
(Continued)

(52) U.S. Cl.
CPC ..... *G01C 21/3679* (2013.01); *G01C 21/3605* (2013.01); *G01C 21/367* (2013.01); *G01C 21/3626* (2013.01); *G06F 9/453* (2018.02); *G06F 16/909* (2019.01); *G06F 16/9038* (2019.01); *G06F 16/90328* (2019.01); *G08G 1/096844* (2013.01); *G01C 21/3617* (2013.01);
(Continued)

(58) Field of Classification Search
CPC ............ G01C 21/3679; G01C 21/3617; G06F 16/909; G06F 16/9038; G08G 1/096844
See application file for complete search history.

(56) References Cited

U.S. PATENT DOCUMENTS 8,600,577 B2 * 12/2013 Bourque .......... G08G 1/096888
701/2
9,185,461 B2 * 11/2015 Ozawa ............... H04N 21/4524
(Continued)

FOREIGN PATENT DOCUMENTS

JP     2006-119132 A    5/2006
JP     2007-78366 A     3/2007
(Continued)

OTHER PUBLICATIONS

Japanese Office Action for Japanese Application No. 2020-113490, dated Jun. 22, 2021, with English translation.

*Primary Examiner* — Khoi H Tran
*Assistant Examiner* — Aaron G Cain
(74) *Attorney, Agent, or Firm* — Birch, Stewart, Kolasch & Birch, LLP

(57) ABSTRACT

To provide a user with more appropriate information on the spot around the route. A search system includes an acquisition unit, a determining unit, a search unit, and an output unit. The acquisition unit acquires a current position of a moving body and information on a route from the current position to a position of a destination. The determining unit determines a width of a search range dynamically changed along the route, based on the current position and the information on the route. The search unit searches for a spot present within the search range. The output unit outputs information on a searched spot.

11 Claims, 27 Drawing Sheets

(51) Int. Cl.
*G06F 9/451* (2018.01)
*G08G 1/0968* (2006.01)
*G06F 16/9038* (2019.01)
*G06F 16/9032* (2019.01)

(52) U.S. Cl.
CPC ..... *G01C 21/3664* (2013.01); *G01C 21/3682* (2013.01)

(56) References Cited

U.S. PATENT DOCUMENTS

| | | | |
|---|---|---|---|
| 10,823,578 B1* | 11/2020 | England | G06F 16/9535 |
| 11,326,893 B2* | 5/2022 | Kitagawa | G01C 21/3679 |
| 2006/0089788 A1* | 4/2006 | Laverty | G01C 21/3679 |
| | | | 701/426 |

FOREIGN PATENT DOCUMENTS

| | | |
|---|---|---|
| JP | 2008-241262 A | 10/2008 |
| JP | 2014-181932 A | 9/2014 |
| JP | 2015-161553 A | 9/2015 |
| JP | 2019-70985 A | 5/2019 |

* cited by examiner

| POINT NAME | SPOT POSITION INFORMATION |
|---|---|
| A TOWN | $x_a, y_a$ |
| B VILLAGE | $x_b, y_b$ |
| ... | ... |
| ○○ HALL | $x_n, y_n$ |
| ... | ... |

| SPOT NAME | SPOT POSITION INFORMATION | ANALYSIS INFORMATION | CATEGORY | MEDIA INFORMATION | DATE AND TIME INFORMATION | SCORE | ... |
|---|---|---|---|---|---|---|---|
| N RAMEN | x1, y1 | N RAMEN, DELICIOUS | RESTAURANT | A0001 | yyyy/mm/d1 | 78 | ... |
| TRAFFIC JAM | x2, y2 | POINT A, TRAFFIC JAM BY ACCIDENT | NEWS | A0002 | yyyy/mm/d2 | 64 | ... |
| ... | ... | ... | ... | ... | ... | ... | ... |

SEARCH SYSTEM, SEARCH METHOD, AND RECORDING MEDIUM FOR RECORDING SEARCH PROGRAM

CROSS-REFERENCE TO RELATED APPLICATION

This application claims the benefit of the priority, based on the benefit of the priority of Japan patent application No. 2019-124091 filed on Jul. 3, 2019 and Japan patent application No. 2020-113490 filed on Jun. 30, 2020, which are incorporated herein by reference in its entirety.

FIELD

The present invention relates to a search system, a search method, and a search program.

BACKGROUND

A navigation system, for example, uses a technique of searching for a spot around a route when searching for the route from a present location to a destination. The technique of searching for the spot around the route enables a user to stop at the searched spot on the way to the destination.

As the technique pertain to searching for the spot around the route, there is disclosed the technique that searches for facilities within a search range centered on a link on a road where a driving route is set (for example, see JP-A-2014-181932).

As the technique pertain to searching for the spot around the route, there is disclosed the technique that enlarges the search range if geographical conditions that enables easy access to a Point Of Interest (POI) is satisfied (for example, see JP-A-2006-119132).

As the technique pertain to searching for the spot around the route, there is disclosed the technique that searches for facilities around a guided route and performs evaluation of the searched facility, based on predetermined evaluation conditions (for example, see JP-A-2015-161553).

SUMMARY

In a technique searching for a spot around a route, the wider a search range is, the more spots will be extracted, and search processing and data transmission of search results tend to take time. In the technique searching for the spot around the route, the narrower the search range is, the less spots will be extracted, and thus possibility that it tends to be highly likely that a user cannot find a spot to stop at.

In one aspect, it is an object of the invention to provide a user with more appropriate information on the spot around the route.

According to one aspect, a search system includes an acquisition unit, a determining unit, a search unit, and an output unit. The acquisition unit acquires a current position of a moving body and information on a route from the current position to a position of a destination. The determining unit determines a width of a search range dynamically changed along the route, based on the current position and the information on the route. The search unit searches for a spot present within the search range. The output unit outputs information on a searched spot.

According to another aspect, a search method includes: acquiring a current position of a moving body, and information on a route from the current position to a position of a destination by a computer; determining a width of a search range dynamically changed along the route, based on the current position and the information on the route by the computer; searching for a spot present within the search range by the computer; and outputting information on a searched spot by the computer.

According to another aspect, a search program causes a computer to execute: acquiring a current position of a moving body, and information on a route from the current position to a position of a destination; determining a width of a search range dynamically changed along the route, based on the current position and the information on the route; searching for a spot present within the search range; and outputting information on a searched spot.

The one aspect provides a user with more appropriate information on the spot around the route.

BRIEF DESCRIPTION OF THE DRAWINGS

FIG. 20 is a drawing illustrating point name information according to the second embodiment;

FIG. 21 is a drawing illustrating spot management information according to the second embodiment;

DETAILED DESCRIPTION

First Embodiment

Figure 1:
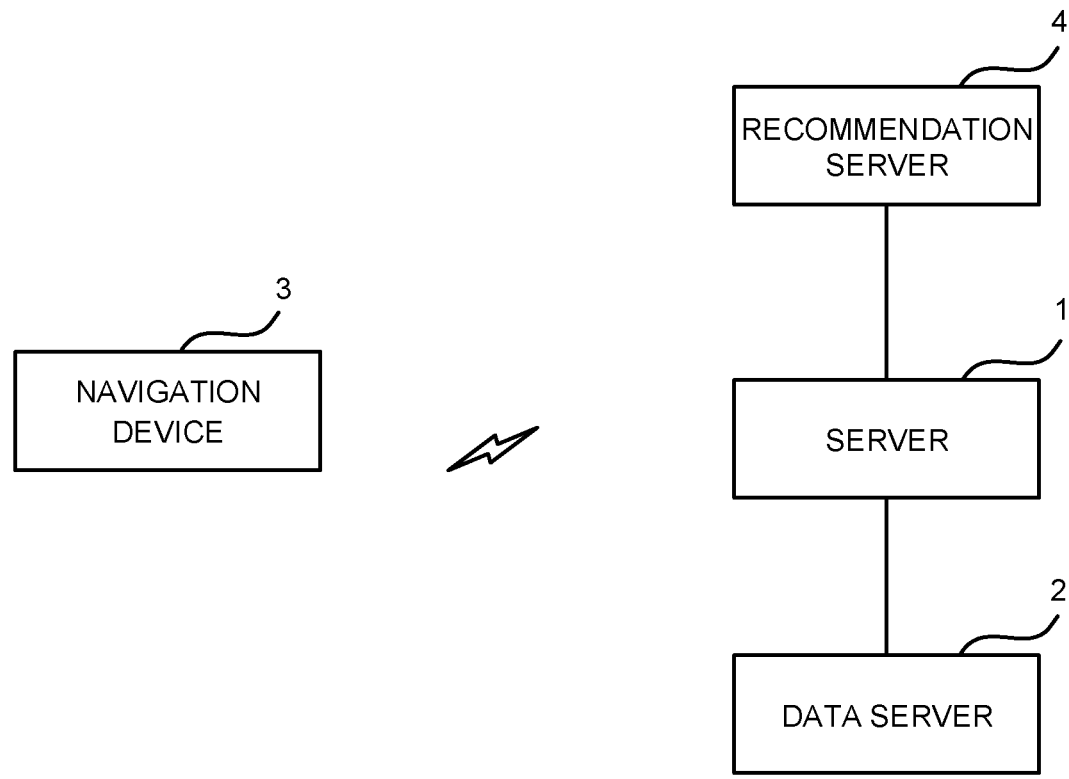
FIG. 1 is a drawing illustrating one example of an overall configuration of a search system of a first embodiment.

The following describes a first embodiment with reference to the drawings. FIG. 1 is a drawing illustrating one example of an overall configuration of search system of the first embodiment. A system of the first embodiment includes a server 1, a data server 2, a navigation device 3, and a recommendation server 4. The server 1 and the navigation device 3 can communicate with one another via, for example, a wireless base station and a relay device. The server 1 and the data server 2 can communicate with one another via, for example, a Local Area Network (LAN). The server 1 and the recommendation server 4 can communicate with one another via, for example, LAN. The server 1 functions as a computer constituting the search system.

The server 1, in response to a request from the navigation device 3, searches for a spot around a route from a current position of a moving body mounting the navigation device 3 to a destination. The server 1 uses information on a spot stored within the data server 2 when searching for the spot. Information on the spot includes, for example, a spot ID, a spot name, position coordinates of the spot, an address, or an explanation of the spot.

The navigation device 3 is mounted, for example, in the moving body. The moving body includes, for example, an automobile, a motorcycle, a bicycle, or a snowmobile. The moving body is not limited only to an automobile, a motorcycle, a bicycle, or a snowmobile. The moving body may be a human. The navigation device 3 may be an information processing terminal. The information processing terminal includes, for example, a smart phone, a tablet personal computer, or a laptop personal computer. The navigation device 3 receives the information on the spot acquired by the search of the server 1. The navigation device 3 displays the obtained information on the spot to provide a user with a candidate of the spot to stop at.

The recommendation server 4 stores information on a favorite spot registered by a user. The recommendation server 4 may store the information on the spot selected by the user. The recommendation server 4 may store the information on the spot where the user has visited in the past. The recommendation server 4, for example, based on the information on the favorite spot, the information on the spot selected by the user, and the information on the spot where the user has visited in the past, extract a recommendation spot of the searched spots to transmit the information on the extracted spots to the server 1. The recommendation server 4 can extract the recommendation spot by also using an attribute of the user, such as age or date, gender, and hobbies when it is possible to identify the individual users by, for example, the user ID, in the navigation device 3.

Figure 2:
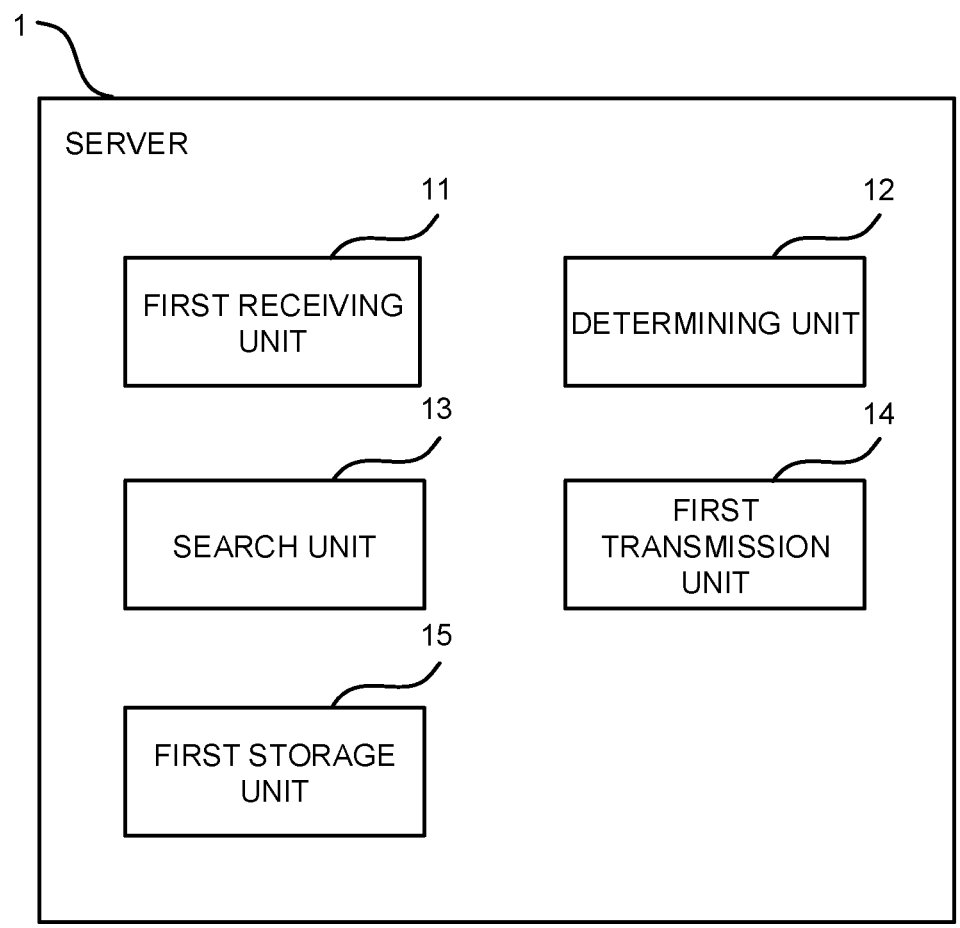
FIG. 2 is a drawing illustrating one example of a functional configuration of a server according to the first embodiment.

FIG. 2 is a drawing illustrating one example of the functional configuration of the server 1. The server 1 includes a first receiving unit 11, a determining unit 12, a search unit 13, a first transmission unit 14, and a first storage unit 15.

The first receiving unit 11 is configured to receive the information on the current position of the moving body, the position of the destination of the moving body, and the route from the current position of the moving body to the position of the destination from the navigation device 3. The first receiving unit 11 may be configured to receive a transmission request for the spot or the transmission request for the recommendation spot from the navigation device 3. The current position of the moving body is, for example, the positional coordinates of the moving body at a time when the navigation device 3 performs a route search. The information on the destination is the positional coordinates indicating the position of the set destination. The information on the route is, for example, the coordinates of a plurality of points within the route and the number of the points that are set by the navigation device 3. Hereinafter, in the route, which is set by the navigation device 3, from the current position of the moving body to the position of the destination, a starting point to search for the spot is referred to as a search starting point. The search starting point is also the coordinates of the point. In other words, the information on the route includes a plurality of search starting points. The first receiving unit 11 may further receive a radius of a search range, the number of return requests for the spot, presence or absence of necessity of recommendation, the user ID, and a search category from the navigation device 3.

The first receiving unit 11 is one example of an acquisition unit that acquires the information on the current position of the moving body, and the route from the current position to the position of the destination, according to the embodiment. For example, when the server 1 includes the function of the navigation device 3, the acquisition unit may acquire the information on the current position of the moving body, and the route from the current position to the position of the destination, from the function of the navigation device 3.

The determining unit 12 determines a width of the search range that is dynamically changed along the route, based on the information on the current position and the route that are received by the first receiving unit 11. The determining unit 12 determines a plurality of search ranges around the route, which have different widths corresponding to the distance from the current position, for example, based on the information on the current position and the route that are received by the first receiving unit 11. For example, the search range becomes wide as the distance from the current position becomes long and becomes narrow as the distance from the current position becomes short. The determining unit 12, for example, determines circles centered on the search starting point and the destination as the search ranges. Furthermore, the determining unit 12 may determine the circles centered on the points between the plurality of search starting points as the search range. The determining unit 12 may apply the radius received from the navigation device 3 as the radius of the circle indicating the search range.

The determining unit 12 may dynamically change the width of the search range in accordance with elapsed time. The determining unit 12, for example, may determine to narrow the search range early morning and late at night as users are unlikely to stop at the spot. The determining unit 12, for example, may determine to widen the search range during daytime hours as users are more likely to stop at the spot.

The search unit 13 searches for the spot present within the search range. The search unit 13, for example, transmits a query including search conditions to the data server 2 to receive the information on the spot corresponding to the search conditions from the data server 2. The search conditions include, for example, the search starting point coordinates indicating the coordinates of the search starting point, a circular shape with a predetermined radius centered on the search starting point to be a starting point of the search range, and the search category. The search category includes, for example, an eating place, a gas station, or transportation facilities. It is only necessary that the search unit 13 can search for the spot the latitude and longitude of which exist within the search range.

The search unit 13 may search for an event together with the spot. The event is, for example, a festival, an exhibition, or a sport event. In this case, the search unit 13 transmits the search conditions including an event type to the data server 2 to receive the information on the event. The information on the event includes, for example, the description of the event, the spot name where the event is held, the position coordinates of the spot, the address, or the description of the spot. In the search for the event, the information on the spot in the following description includes the information on the event.

When a transmission request for the spot with the recommendation is transmitted from the navigation device 3, the first transmission unit 14 transmits a provision request for a recommended spot together with the information on the searched spot, the user ID, and the number of return requests for the spot to the recommendation server 4. Hereinafter, the spot with recommendation is also referred to as a recommendation spot. Then, the recommendation server 4 extracts the recommendation spot from the searched spot, based on the favorite spot of the user that is preliminarily stored, the spot that has been selected by the user, or the spot where the user has visited. Then, the recommendation server 4 transmits the information on the recommendation spot to the server 1. The recommendation server 4, for example, determines the number of recommendation spots corresponding to the received number of return requests. The server 1 may execute the processing of the recommendation server 4.

The first transmission unit 14 transmits the information on the recommendation spot transmitted from the recommendation server 4 to the navigation device 3. When an extraction processing by the recommendation server 4 is unnecessary, the first transmission unit 14 transmits the information on the spot searched by the search unit 13 to the navigation device 3.

The first transmission unit 14 is one example of an output unit that outputs the information on the searched spot and the information on the recommendation spot, according to the embodiment. For example, when the server 1 includes the function of the navigation device 3, the output unit may output the information on the searched spot and the information on the recommendation spot to the function of the navigation device 3. The output unit is not limited to the first transmission unit 14 and may be, for example, a display device. The display device includes, for example, a display.

The first storage unit 15 stores various pieces of information on the processing of the server 1. The first storage unit 15 stores, for example, the information that the first receiving unit 11 has received from the navigation device 3, the information on the spot that is the search result of the search unit 13, the information on the recommendation spot received from the recommendation server 4.

Figure 3:
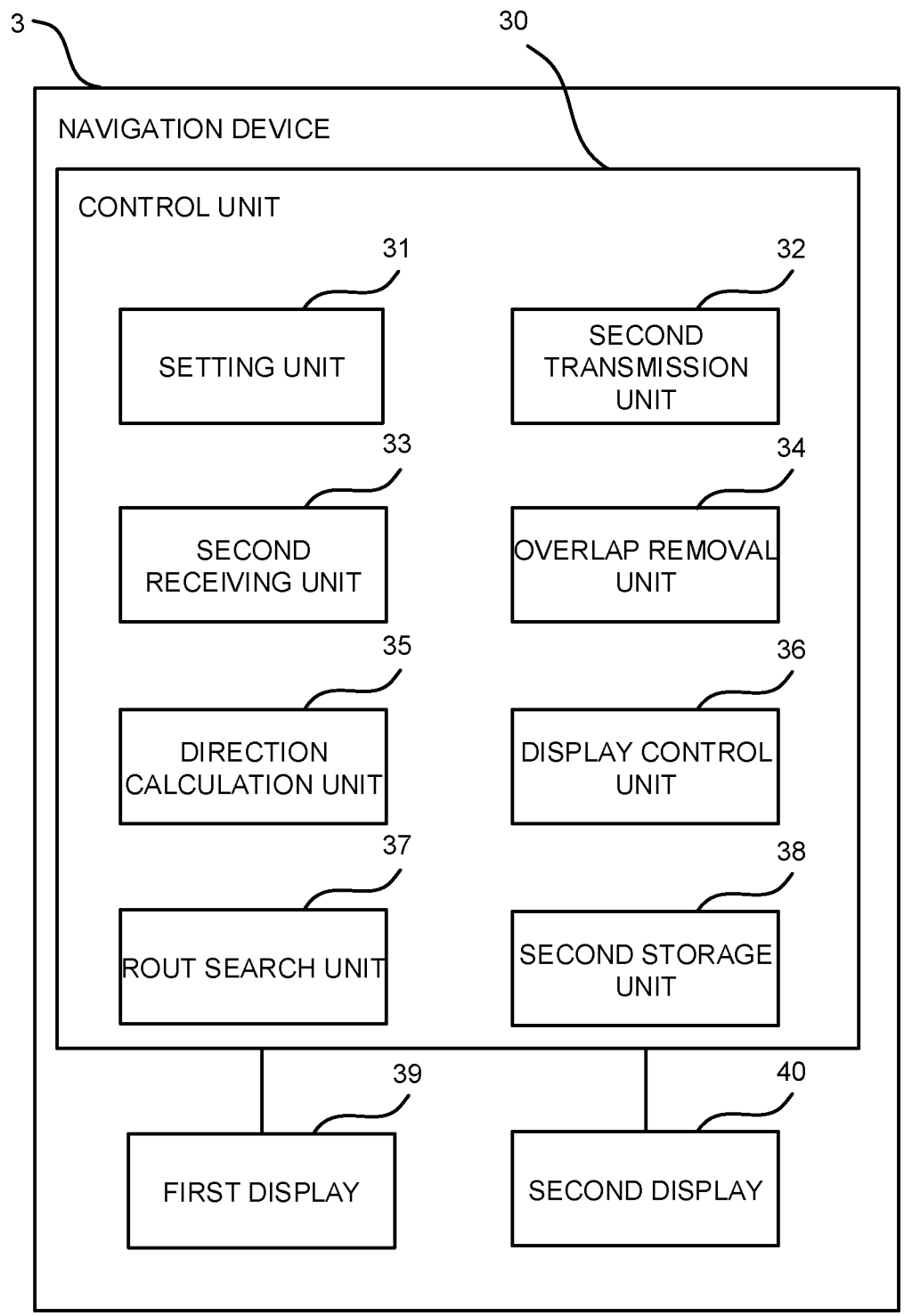
FIG. 3 is a drawing illustrating one example of a navigation device according to the first embodiment.

FIG. 3 is a drawing illustrating one example of the navigation device 3. The navigation device 3 includes a control unit 30, a first display 39, and a second display 40. The control unit 30 includes a setting unit 31, a second transmission unit 32, a second receiving unit 33, an overlap removal unit 34, a direction calculation unit 35, a display control unit 36, a route search unit 37, and a second storage unit 38. The control unit 30 communicate with the first display 39 and the second display 40 by wire or wireless.

The control unit 30 and the first display 39 of the navigation device 3 may be, for example, a smart phone having the navigation function. In the case of the smart phone having the navigation function, the second display 40 is a display that can communicate with the smart phone.

When the search for the route is performed, the setting unit 31 sets a plurality of search starting points within the route from the current position to the destination. The setting unit 31 sets, for example, a search starting point for each predetermined distance on the route. The setting unit 31 may set a search category in response to the operation of the user. When it is possible to identify an individual user by, for example, the user ID, the setting unit 31 may set, for example, login by the user.

The second transmission unit 32, in response to the operation of the user, transmits a transmission request for the spot or a transmission request for the recommendation spot together with the information on the current position of the moving body mounting the navigation device 3, the position of the destination of the moving body, the route from the current position of the moving body to the position of the destination, to the server 1. The information on the route is, for example, the coordinates of the plurality of search starting points set by the setting unit 31 and the number of search starting points. The second transmission unit 32 may further transmit the radius of the search range, the number of return requests of the spot, the user ID, the search category to the server 1. After the second transmission unit 32 transmits the various pieces of information to the server 1, the server 1 executes, for example, spot search processing as described above.

The second receiving unit 33 receives the information on the spot transmitted from the first transmission unit 14 of the server 1.

When the received information on the spot overlaps with the information that has already been received, the overlap removal unit 34 removes the overlapping information. The overlap removal unit 34 does not necessarily have to be arranged in the navigation device 3 and may be arranged in the server 1.

The direction calculation unit 35 calculates the direction of the spot with respect to the route. The direction calculation unit 35 refers to, for example, the position coordinate of the spot to calculate the direction toward the spot when viewed from the route. The direction calculation unit 35 may refer to, for example, the position coordinate of the spot to calculate the position of a branch point toward the spot of the routes and to determine in which direction to turn right or left.

The display control unit 36 causes the second display 40 to display a list of the spot. When an event search is being performed, the display control unit 36 causes the second display 40 to display the list of the spot and the event. For example, when a spot name within the displayed list is selected, the display control unit 36 may cause the second display 40 to display an explanation screen including, for example, an address of the selected spot, an explanation, and an event holding time.

The route search unit 37 acquires the current position of the user using, for example, a Global Positioning System (GPS). Then, the route search unit 37 searches for the route from the current position to the destination designated by the user. The route search unit 37 may be configured to be able to acquire the search result of the route from the current position to the destination designated by the user, via the server 1. The route search unit 37 can calculate a predetermined route from map information by using, for example, Dijkstra method. The map information includes the information on a plurality of nodes and links connecting nodes so that a road network can be displayed. The node indicates, for example, intersections and other nodal points in the road network representation. The link indicates a road section between the nodes. Map data includes, for example, a plurality of interpolation points to identify a road shape between the nodes. The interpolation point included in the map data may be used as the search starting point. When the interpolation point is used as the search starting point, it is only necessary that the setting unit 31 can acquire the interpolation point from the map data. When there are too many interpolation points, the search starting point may be set, for example, by thinning out at predetermined intervals.

When the spot displayed on the second display 40 is selected as the destination or a waypoint from the user, the route search unit 37 sets the spot as the destination or the waypoint. Then, for example, when the spot displayed on the second display 40 is set as the destination, the route search unit 37 searches for the route from the present location to the spot. When the spot displayed on the second display 40 is set as the waypoint, the route search unit 37 searches for the route to reach the destination via the spot from the present location.

The second storage unit 38 stores various kinds of pieces of information on the processing of the navigation device 3. The second storage unit 38 stores, for example, the information on the search starting point set by the setting unit 31 and the route for which the route search unit 37 has searched. The second storage unit 38 stores, for example, the information on the spot received by the second receiving unit 33.

The first display 39 executes the display on navigation. The first display 39 displays, for example, the map around the present location, the lines indicating the route, or various kinds of menus.

The second display 40 lists the information on the spot received by the second receiving unit 33. The second display 40 may display an icon indicating the spot on the map. The icon indicating the spot is, for example, an icon 71 shown in FIG. 8. When the event search is performed, the second display 40 displays the list of the spot and event.

The first display 39 is constituted of, for example, a touch panel display. The first display 39 may be constituted of a simple display. The second display 40, similarly to the first display 39, may be constituted of a touch panel display or may be constituted of a simple display. The navigation device 3 may have one display. When the navigation device 3 has one display, the one display may be configured to be able to execute both the display on the navigation and the display on the list of the spot and event.

Figure 4:
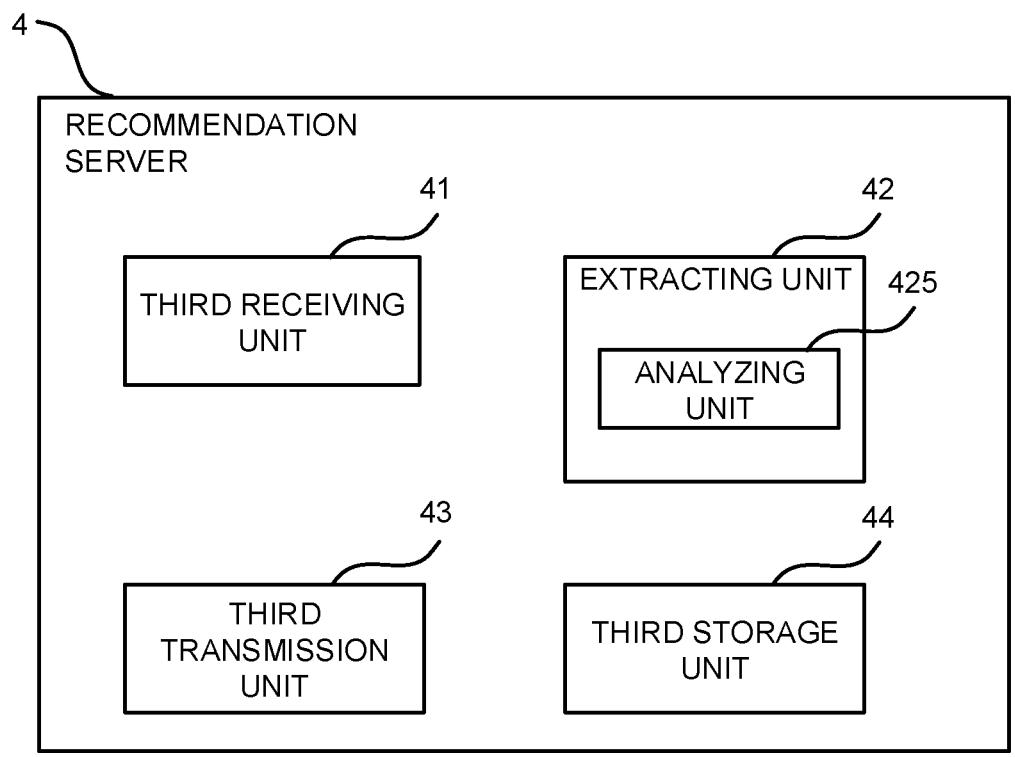
FIG. 4 is a drawing illustrating one example of a functional configuration of a recommendation server according to the first embodiment.

FIG. 4 is a drawing illustrating one example of the functional configuration of the recommendation server 4. The recommendation server 4 includes a third receiving unit 41, an extracting unit 42, a third transmission unit 43, and a third storage unit 44. The extracting unit 42 includes an analyzing unit 425.

The third receiving unit 41 receives the information on the searched spot, the user ID, and the number of return requests for the spot from the server 1.

The extracting unit 42, based on the favorite spot for each user preliminarily stored in the third storage unit 44 and the spot where the user has visited, extracts the recommendation spot from the spots for which the server 1 has searched. The extracting unit 42, for example, identifies the target user by the received user ID to extract the spot that is identical or similar to the favorite spot of the identified user or the spot where the user has visited, as the recommendation spot. The extracting unit 42, for example, vectorizes the favorite spot of the user to determine a degree of similarity with a vector corresponding to the spot stored in the third storage unit 44. The extracting unit 42 can determine that the vectors are similar if a cosine similarity between the vectors is close to 1. The extracting unit 42, for example, determines the number of recommendation spots in response to the received number of return requests. The extracting unit 42 may be included in the server 1.

The extracting unit 42 may include the analyzing unit 425. The analyzing unit 425, for example, analyzes the favorite spots of the plurality of users, the spot selected by the user, or the spot where the user has visited using a machine learning. The analyzing unit 425, for example, is configured to be able to extract the spot favored by the user having similar history as the recommendation spot.

The extracting unit 42, for example, based on the degree of similarity between the favorite spot for each user, the spot where the user has selected, or the spot where the user has visited and each spot searched by the server 1, calculates an evaluation value of each spot searched by the server 1 and the evaluation value of the spot selected by the user. The extracting unit 42 extracts the number of recommendation spots corresponding to the number of return requests, from each spot searched by the server 1, in descending order of the evaluation values. The extracting unit 42 may extract as many spots as the number of return requests, in descending order of the degree of similarity.

The third transmission unit 43 transmits the information on the recommendation spot extracted by the extracting unit 42 to the server 1. The information on the recommendation spot includes, for example, a spot ID of the recommendation spot, the spot name, the position coordinates of the spot, the address, or the explanation of the spot.

The third storage unit 44 stores various kinds of pieces of information regarding the processing of the recommendation server 4. The third storage unit 44 stores the user ID and the information on the favorite spot for each user, the information on the spot that the user has selected, or the information on the spot where the user has visited, in association with one another. In the third storage unit 44, the information on the recommendation spot extracted from various kinds of external devices may be stored. The various kinds of external devices include, for example, a server device constituting a Social Networking Service (SNS). In other words, in the third storage unit 44, word-of mouth information extracted from the server device constituting the SNS or an evaluation generated by scoring the degree of recommendation of POI may be stored.

Figure 5:
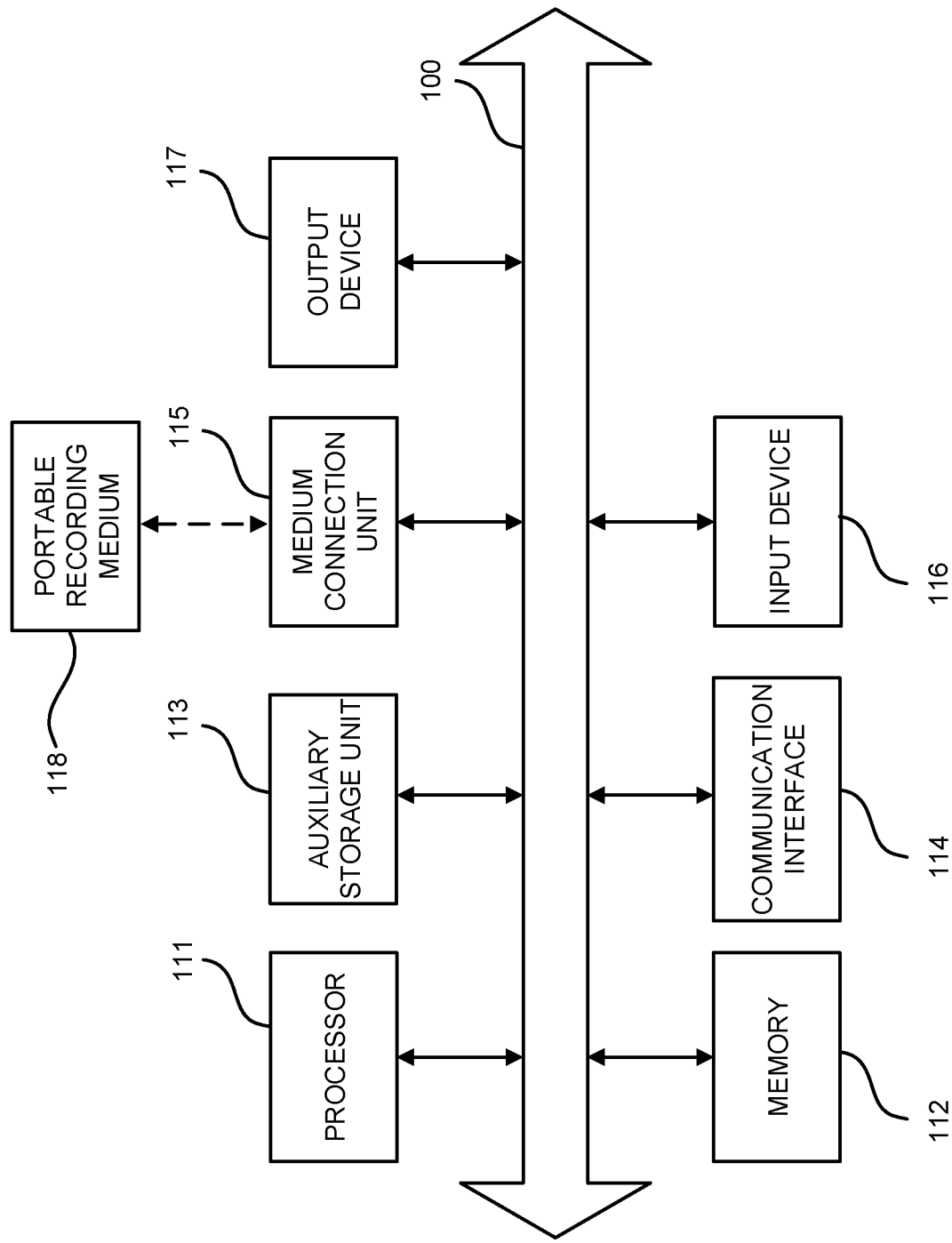
FIG. 5 is a drawing illustrating one example of a hardware configuration of the server.

FIG. 5 is a drawing illustrating one example of the hardware configuration of the server 1. As shown in FIG. 5, the server 1 includes a processor 111, a memory 112, an auxiliary storage unit 113, a communication interface 114, a medium connection unit 115, an input device 116, an output device 117, which are connected to a bus 100.

The processor 111 executes a program loaded in the memory 112. A search program that performs the processing according to the embodiment may be applied to the program to be executed.

The memory 112 is, for example, a Random Access Memory (RAM). The auxiliary storage unit 113 is a storage unit storing various kinds of pieces of information, for example, a hard disk drive or a semiconductor memory. The auxiliary storage unit 113 may store the search program for performing the processing of the embodiment.

The communication interface 114 is configured to be connected to the communication network, for example, the LAN or a Wide Area Network (WAN). The communication interface 114 performs a data conversion associated with communication.

The medium connection unit 115 is an interface to which a portable recording medium 118 can be connected. As the portable recording medium 118, for example, an optical disk or the semiconductor memory is applied. The portable recording medium 118 may store the search program for performing the processing of the embodiment.

The input device 116 is configured to be able to accept the instruction from a user and an input of the information. The input device 116 includes, for example, a keyboard or a pointing device.

The output device 117 is configured to be able to output a query or the instruction to a user and a processing result. The output device 117 includes, for example, a display device, a printer, or a speaker.

The first storage unit 15 shown in FIG. 2 is achieved by, for example, the memory 112, the auxiliary storage unit 113, or the portable recording medium 118. The first receiving unit 11, the determining unit 12, the search unit 13, and the first transmission unit 14 shown in FIG. 2 are achieved, for example, by the processor 111 executing the search program loaded in the memory 112.

The memory 112, the auxiliary storage unit 113, and the portable recording medium 118 are computer-readable, tangible storage media, and non-transitory storage media rather than temporary media such as signal carriers.

The server 1 does not have to include all the components shown in FIG. 5, and some components may be omitted. Some components may exist in a device external to the server 1, and the server 1 may be connected to the external device to use the components inside the external device. The hardware configuration of the data server 2, the navigation device 3, and the recommendation server 4 are also similar to the configuration shown in FIG. 5.

Figure 6A:
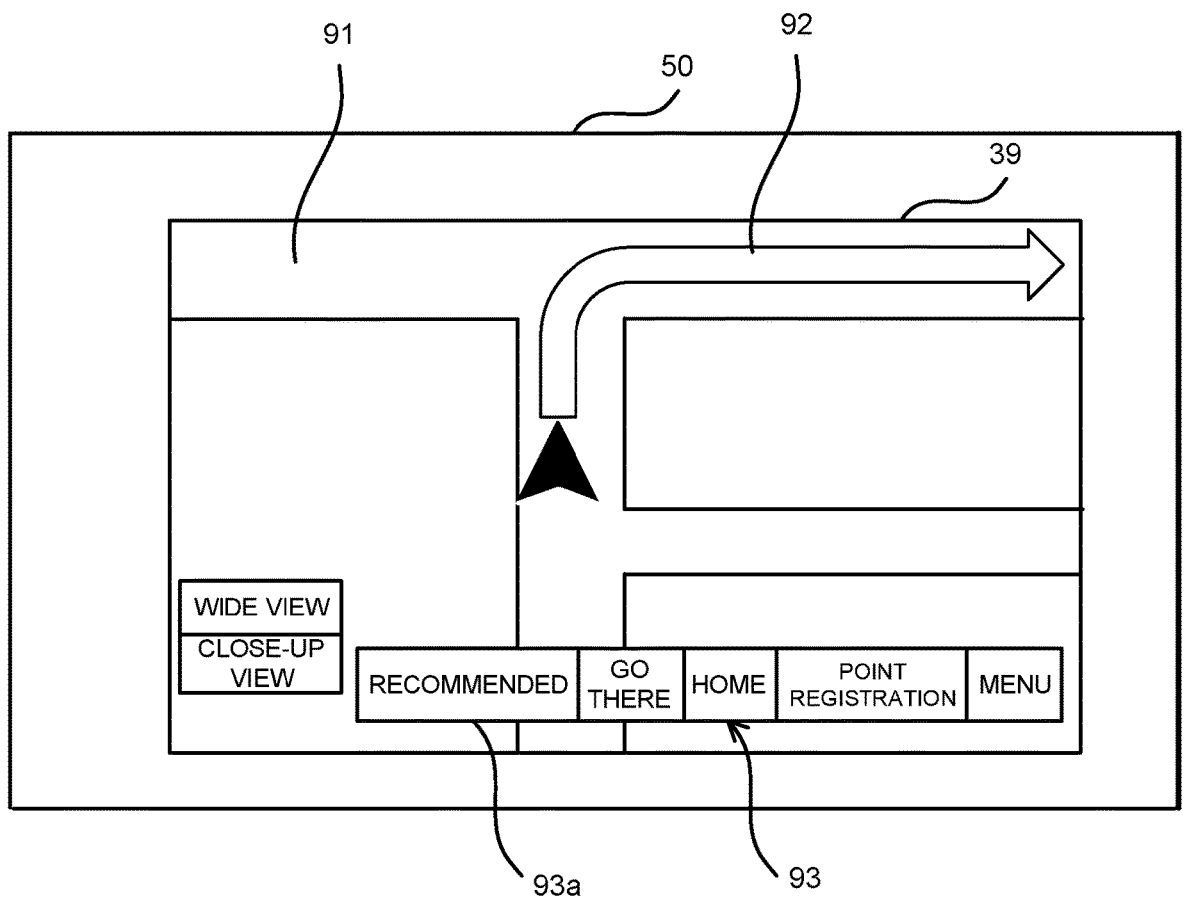
FIG. 6A is a drawing illustrating one example of an appearance of a first display.

FIG. 6A is a drawing illustrating one example of an appearance of the first display 39. A center panel 50 shown in FIG. 6 is installed, for example, between a driving seat and a front passenger seat inside a moving body. As shown in FIG. 6A, the first display 39 is installed, for example, inside the center panel 50. The first display 39 displays, for example, a present location peripheral map 91, a line 92 showing the route, and various menus 93.

Figure 6B:
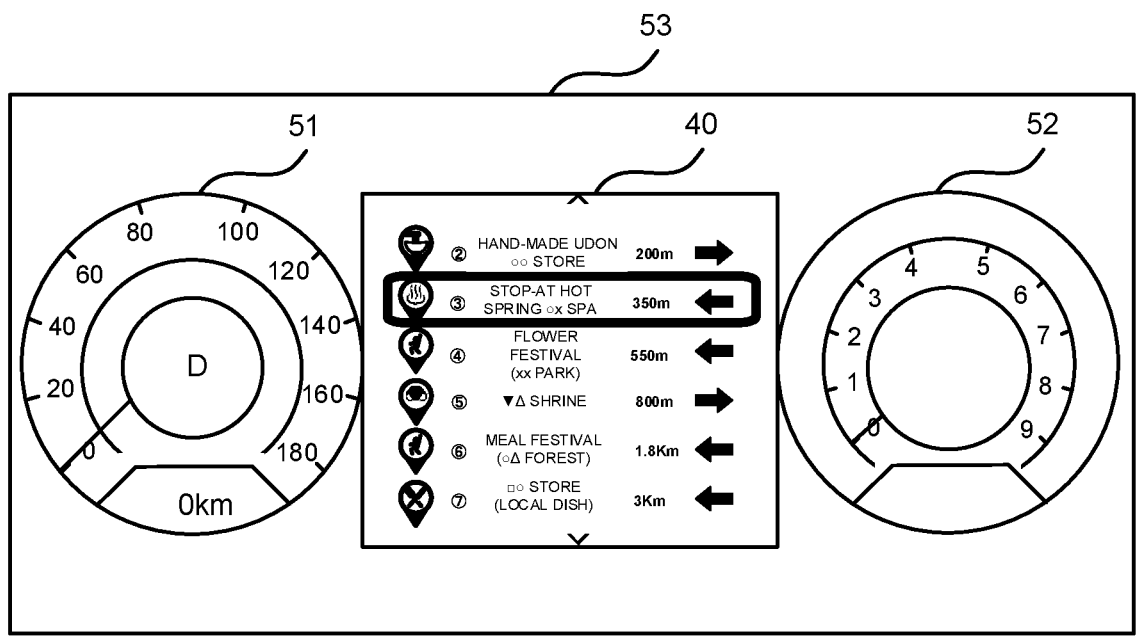
FIG. 6B is a drawing illustrating one example of an appearance of a second display.

FIG. 6B is a drawing illustrating one example of an appearance of the second display 40. An instrumental panel 53 shown in FIG. 6B is installed, for example, in front of a driving seat. As shown in FIG. 6B, the second display 40 is installed, for example, inside the instrumental panel 53. The second display 40 is installed, for example, between a speed meter 51 indicating the speed of the moving body and a rotational speed meter 52 indicating an engine speed. The second display 40 list the information on the spot received by the second receiving unit 33. In FIG. 6B, the spot selected by the user is illustrated by being surrounded by a thick frame.

For example, when the route search is performed, the second transmission unit 32 of the navigation device 3 transmits the current position, the destination information, and the information on the route to the server 1. Or, when a recommendation button 93a of the first display 39 shown in FIG. 6A is tapped after the route search, the second transmission unit 32 transmits the current position, the destination position, and the information on the route to the server 1. Then, when the second receiving unit 33 receives the information on the spot from the server 1, the second display 40 shown in FIG. 6B lists the information on the spot. In FIG. 6B, the spot selected by the user is illustrated by being surrounded by the thick frame.

Figure 7:
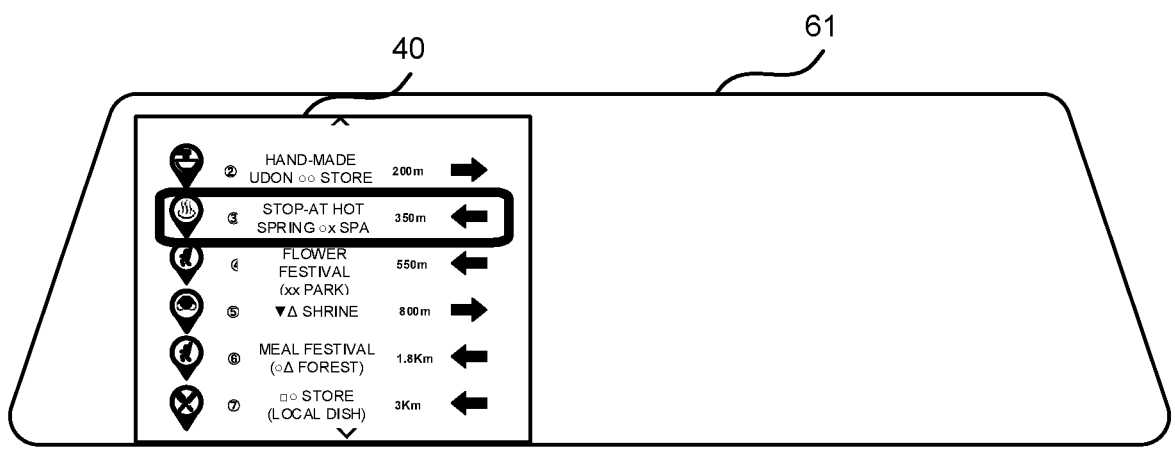
FIG. 7 is a drawing illustrating one example of an inside rear-view mirror monitor.

FIG. 7 is a drawing illustrating one example of an inside rear-view mirror monitor 61. The inside rear-view mirror monitor 61 shown in FIG. 7 is an inside rear-view mirror having the function of the monitor. For example, when the operation for turning on the display of the second display 40 is performed by, for example, the menu of the first display 39 or a remote control operation, the second display 40 is displayed inside the inside rear-view mirror monitor 61. The second display 40, for example, displays the list of the spots semitransparently so that the list overlaps with a background reflected inside the inside rear-view mirror monitor 61. In FIG. 7, the spot selected by the user is illustrated by being surrounded by the thick frame.

Figure 8:
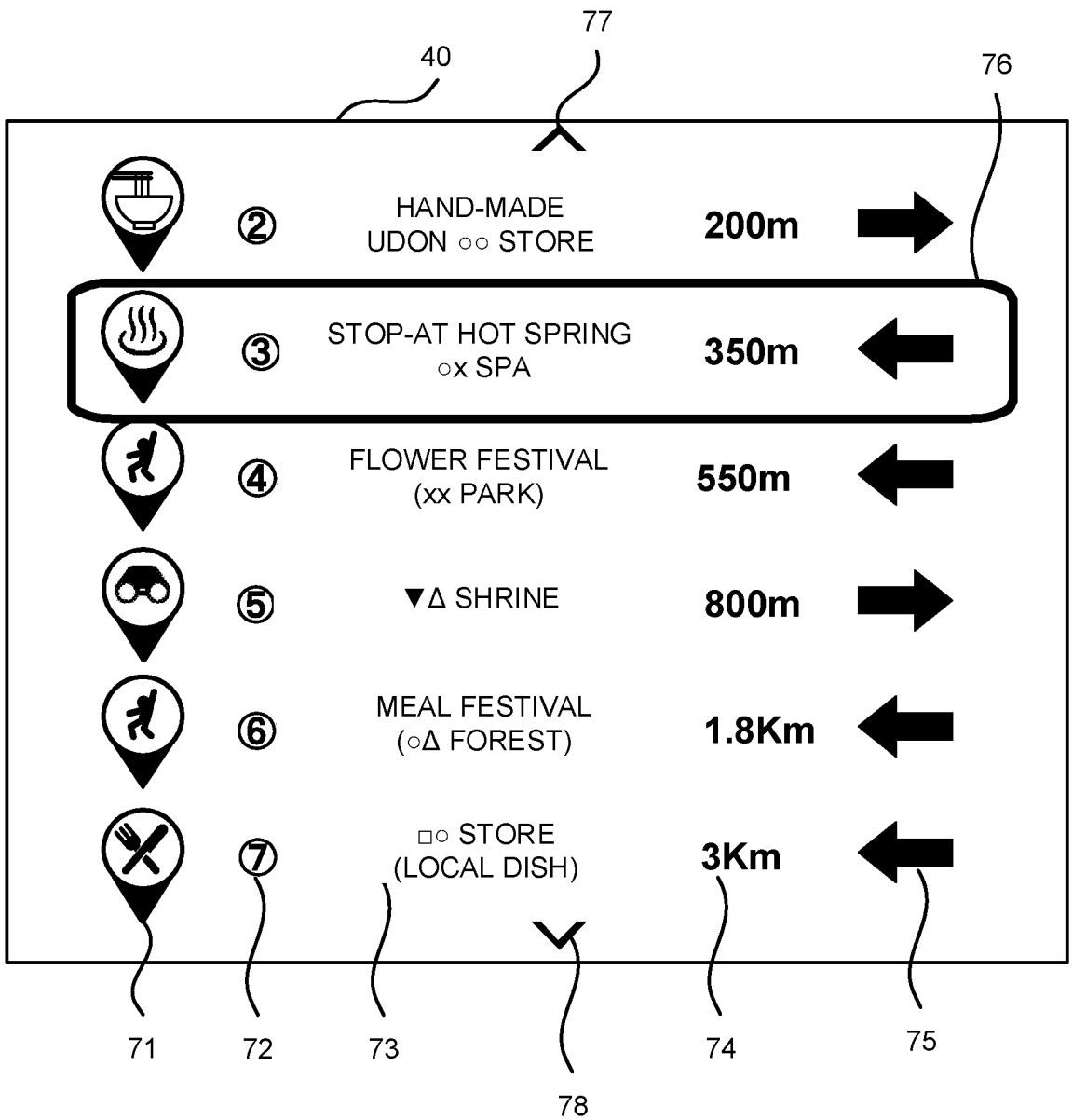
FIG. 8 is a drawing illustrating one example of a spot list.

FIG. 8 is a drawing illustrating one example of a spot list. As shown in FIG. 8, the second display 40 lists the information on the spot. In FIG. 8, the icon 71 is an image indicating the type of spot. The type of spot is associated with the search category. A spot number 72 is, for example, a spot ID. A spot name 73 indicates the name of the spot. When the search for the event held at the spot is performed, the event is displayed in the form of "event name (spot name)." For example, "flower festival" is the event name, and "xx park" is the name of the spot where the flower festival is held. The second display 40 displays a distance display 74, which is a distance from the current position to the spot, and a direction display 75, which is a direction with respect to the spot from the route. The distance shown in the distance display 74 may be the distance to the first right turn point or left turn point when heading to the spot. The direction display 75 may be the direction with respect to the first right turn point or left turn point when heading to the spot.

For example, when a spot name is selected by the touch operation of the user, the display control unit 36 may cause the second display 40 to display the explanation screen including, for example, the address of the spot, the explanation, and the event holding time. In FIG. 8, for example, when a spot name is selected by the touch operation of the user, the second display 40 displays the spot so as to be surrounded by a thick frame 76. When there are many spot names, the display control unit 36 may cause the second display 40 to display a previous screen by an up arrow 77 so as to be able to display other spot names. When there are many spot names, the display control unit 36 may cause the second display 40 to display a next screen by a down arrow 78 so as to be able to display other spot names. FIG. 6B and FIG. 7 are also configured similarly to the configuration of FIG. 8. The navigation device 3 may output, for example, the spot address, the explanation, and the event holding time by voice. The navigation device 3 may perform the display in accordance with the instruction by the voice of the user using voice recognition. For example, when the voice of "explain 2" is recognized, the display control unit 36 displays the description of "hand-made Udon ∘ ∘ store," which is the spot corresponding to the designated spot number. For example, when the spot name is selected by the touch operation or by voice, the navigation device 3 may set the spot as the destination or the waypoint.

Figure 9A:
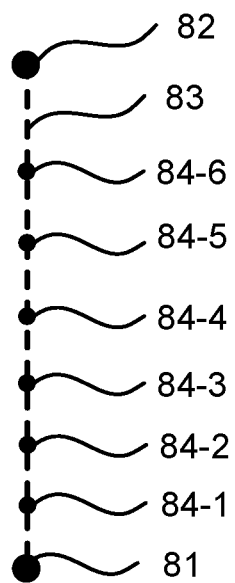
FIG. 9A is a drawing illustrating a current position, a destination, and a search starting point used for a first example of a search range.

FIG. 9A is a drawing illustrating the current position, the destination, the search starting point used in a first example of the search range. FIG. 9A shows a current position 81, a destination 82, a first search starting point 84-1 to a sixth search starting point 84-6 on a route 83. FIG. 9A is based on the coordinates of the current position, the coordinates of the destination, and the coordinates of the search starting points that are transmitted to the server 1 from the navigation device 3.

Figure 9B:
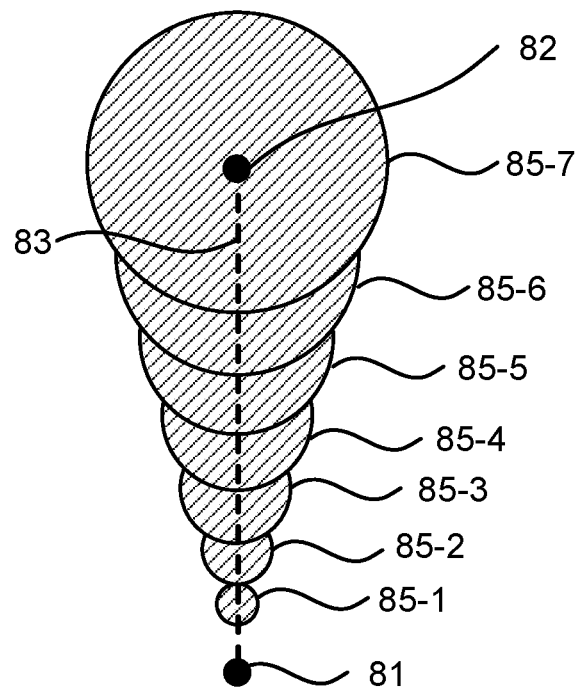
FIG. 9B is a drawing illustrating the first example of the search range.
Figure 10:
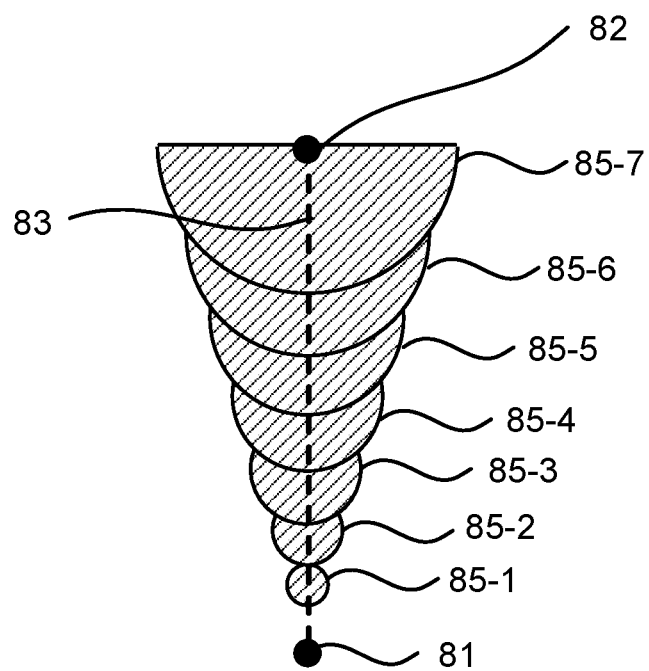
FIG. 10 is a drawing illustrating a second example of the search range.

FIG. 9B is a drawing illustrating the first example of the search range. FIG. 9B shows the current position 81, the destination 82, a first search range 85-1 to a seventh search range 85-7 around the route 83. The first search range 85-1 to the sixth search range 85-6 are circles centered on the first search starting point 84-1 to the sixth search starting point 84-6. The seventh search range 85-7 is the circle centered on the destination. Namely, the determining unit 12 determines the circles centered on each search starting point and the destination as the search range. The search range is not necessarily limited to a perfect circle range, and the search range may be a polygonal range or an elliptical range. Each search range has the different width corresponding to the distance from the current position. In the example shown in FIG. 9B, the search range becomes wide as the distance from the current position becomes long, and becomes narrow as the distance from the current position becomes short. In the examples of FIG. 9B and FIG. 10 and subsequent figures, the description of the search starting point is omitted except for some search starting points.

For example, while it is assumed that the user will stop at the spot for, for example, meals and breaks when heading to the destination, in an area close from the current position, it is considered unlikely to stop at a spot far from the route. Thus, the determining unit 12 determines a narrowed range as the search range as the distance from the current position becomes short. In other words, in the case of the first example, it can be said that the search system of the embodiment dynamically changes the search range with movement of the moving body. For example, in the search device of the embodiment, the search range may change with time. Namely, the search system may change the search range in accordance with distance and time.

FIG. 10 is a drawing illustrating the second example of the search range. In the second example shown in FIG. 10, the first search range 85-1 to the sixth search range 85-6 are similar to the first example shown in FIG. 9B. Each search range becomes wide as the distance from the current position becomes long and becomes narrow as the distance from the current position becomes short. In the second example, in the seventh search range 85-7, an area beyond the destination with respect to the current position is removed from the search range. Namely, the determining unit 12 removes the area beyond the destination from the search range. This is because it is considered unlikely that the user will stop at the spot in the area beyond the destination.

Figure 11:
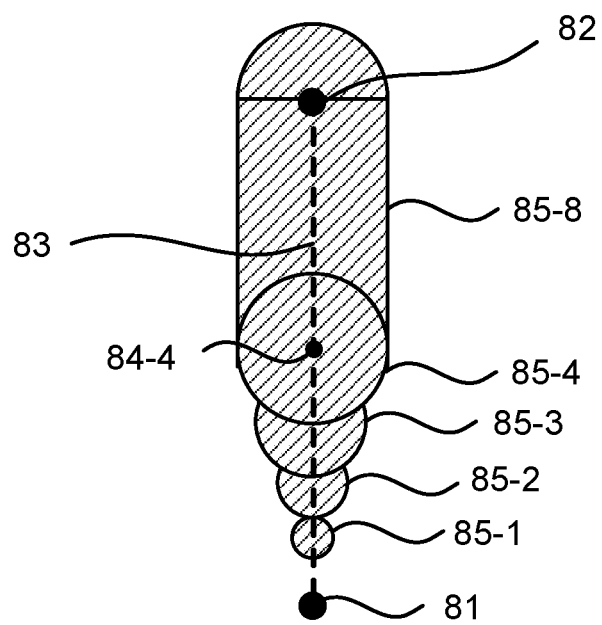
FIG. 11 is a drawing illustrating a third example of the search range.

FIG. 11 is a drawing illustrating the third example of the search range. In the third example shown in FIG. 11, the search ranges (the first search range 85-1 to the fourth search range 85-4) within the predetermined distance from the current position are similar to the examples shown in FIG. 9 and FIG. 10, and become wide as the distance from the current position becomes long and becomes narrow as the distance from the current position becomes short. In the third example, the search range (an eighth search range 85-8) from the predetermined position (the fourth search starting point 84-4) to the destination is a strip-shaped range with a constant width. Namely, the determining unit 12 determines the search range so as not to increase the search range from the predetermined position to the destination. This is because it is considered unlikely that a user will stop at a spot far from the route when the user stops at a spot and then heads to the destination.

Figure 12:
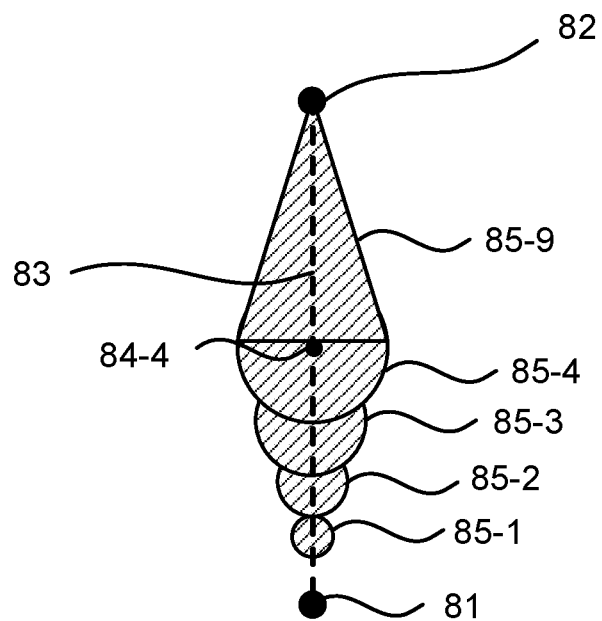
FIG. 12 is a drawing illustrating a fourth example of the search range.

FIG. 12 is a drawing illustrating the fourth example of the search range. In the fourth example shown in FIG. 12, the first search range 85-1 to the fourth search range 85-4 are similar to the examples shown in FIG. 9 to FIG. 11. Each search range becomes wide as the distance from the current position becomes long and becomes narrow as the distance from the current position becomes short. In the fourth example, the search range (a ninth search range 85-9) from the predetermined position (the fourth search starting point 84-4) to the destination becomes narrow as the distance from the current position becomes long and becomes wide as the distance from the current position becomes short. Namely, the search range in the fourth example becomes wide as the distance from the current position becomes long and becomes narrow as the distance from the current position becomes short in the area from the current position to the predetermined position, and becomes narrow as the distance from the current position becomes long and becomes wide as the distance from the current position becomes short in the area from the predetermined position to the destination. This is because it is considered unlikely that a user will stop at a spot in the area close to the destination.

Figure 13:
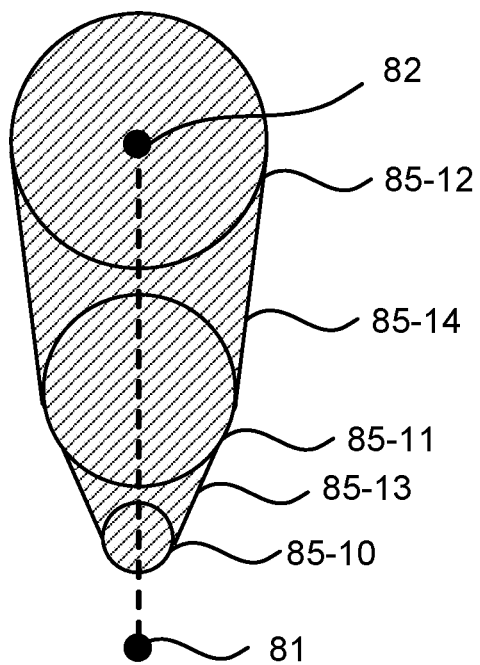
FIG. 13 is a drawing illustrating a fifth example of the search range.

FIG. 13 is a drawing illustrating the fifth example of the search range. In the fifth example shown in FIG. 13, there presents a circular tenth search range 85-10, an eleventh search range 85-11 centered on the search starting point, and a circular twelfth search range 85-12 centered on the destination. There presents a thirteenth search range 85-13 framed by a tangent of the tenth search range 85-10, the eleventh search range 85-11, and a fourteenth search range 85-14 framed by a tangent of the eleventh search range 85-11, the twelfth search range 85-12. The server 1, by applying the fifth example, can determine an appropriate search range even when the positions of the circular search range centered on the search starting point and the circular search range centered on the destination are separated. In other words, the search device of the embodiment, in the case of the fifth example, continuously changes the search range with the movement of the moving body. It can be said that the search device of the embodiment, in the case of the fifth example, dynamically changes the search range with the movement of the moving body.

Figure 14:
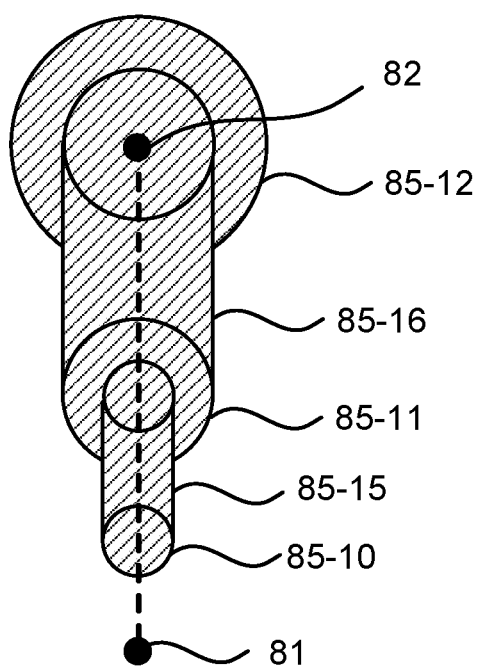
FIG. 14 is a drawing illustrating a sixth example of the search range.

FIG. 14 is a drawing illustrating the sixth example of the search range. In the sixth example shown in FIG. 14, the circular tenth search range 85-10, the circular eleventh search range 85-11 centered on the search starting point, and the circular twelfth search range 85-12 centered on the destination are similar to the example in FIG. 5. In the sixth example, there presents a strip-shaped fifteenth search range 85-15 between the circular tenth search range 85-10 and the circular eleventh search range 85-11. The width of the fifteenth search range 85-15 is set to be identical to the smaller diameter (the tenth search range 85-10) of the diameters of the search ranges at both ends of the thirteenth search range 85-13 (the tenth search range 85-10, the eleventh search range 85-11). Similarly, the width of a strip-shaped sixteenth search range 85-16, which resides between the circular eleventh search range 85-11 and the circular twelfth search range 85-12, is set to be identical to the smaller diameter (the eleventh search range 85-11) of the diameters of the search ranges at both ends (the eleventh search range 85-11 and the twelfth search range 85-12). In other words, the search device of the embodiment, in the case of the sixth example, intermittently changes the search range with the movement of the moving body. It can be said that the search device of the embodiment, in the case of the sixth example, dynamically changes the search range with the movement of the moving body.

The server 1, by applying the sixth example, similarly to the fifth example, can determine an appropriate search range even when the positions of the search range centered on the search starting point and the search range centered on the destination are separated. In the sixth example, compared with the fifth example, a narrowed search range ensures a shorten search processing time and a reduced volume of communication in transmission of the information of the spot.

A user may be able to set from the navigation device 3 which search range of the first example to the sixth example to apply. Then, the second transmission unit 32 may transmit the setting of which search range of the first example to the sixth example to be applied to the server 1. The determining unit 12 of the server 1 applies any one of the settings of the first example to the sixth example in accordance with the setting. The determining unit 12 may determine the search range where the first example to the sixth example are combined. For example, the determining unit 12 may remove the area beyond the destination from the search range in the third example, the fifth example, and the sixth example, similarly to the second example.

Figure 15:
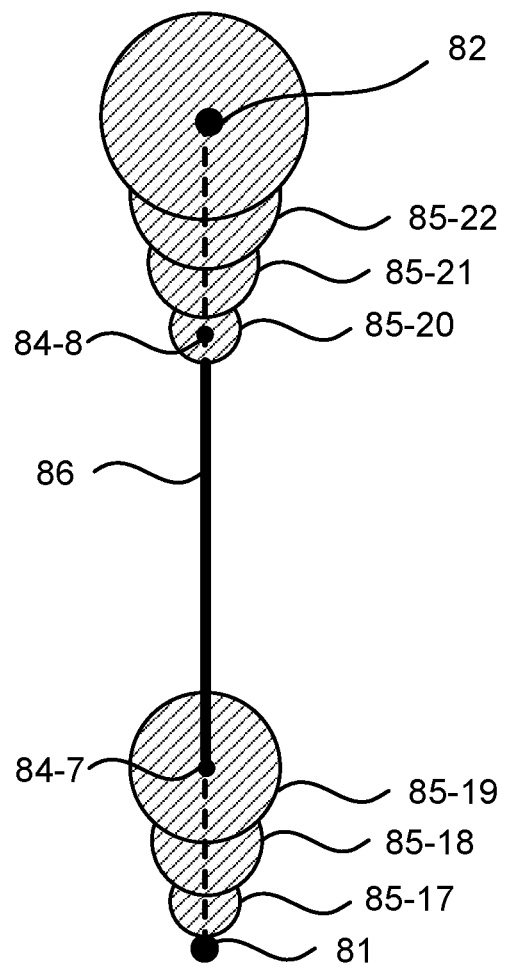
FIG. 15 is a drawing illustrating a seventh example of the search range.

FIG. 15 is a drawing illustrating the seventh example of the search range. In the seventh example, a seventh search starting point 84-7 is an interchange (IC) set as an entrance of an expressway 86, and an eighth search starting point 84-8 is an IC set as an exit of the expressway 86. Namely, the route that heads to the destination passing through the expressway 86 between the seventh search starting point 84-7 and the eighth search starting point 84-8 is set by the navigation device 3. In this case, it is considered unlikely to exit the expressway on the way to stop at the spot. Thus, the determining unit 12, of the routes that is set, restricts placing the search ranges around the expressway.

A seventeenth search range 85-17 and an eighteenth search range 85-18 from the current position to the entrance of the expressway become wide as the distance from the current position becomes long and becomes narrow as the distance from the current position becomes short. A twentieth search range 85-20 to a twenty-second search range 85-22 from the exit of the expressway to the destination become wide as the distance from the exit of the expressway becomes long and becomes narrow as the distance from the current position becomes short, namely similar to the first example shown in FIG. 9. In the seventh example, the search range similar to the second example to the sixth example may be applied to the search range from the current position to the entrance of the expressway and the search range from the exit of the expressway to the destination.

Thus, in the case where an expressway is included in the route, applying the seventh example enables the server 1 to appropriately determine the search range.

In the embodiment, there is no burdensome in selection of a stop-at spot, for example, a present spot is included in the direction opposite to the traveling direction due to increase of the number of spots in the search result presented to a user. The embodiment ensures improved efficiency of the processing in providing the information on the spot around the route.

Figure 16:
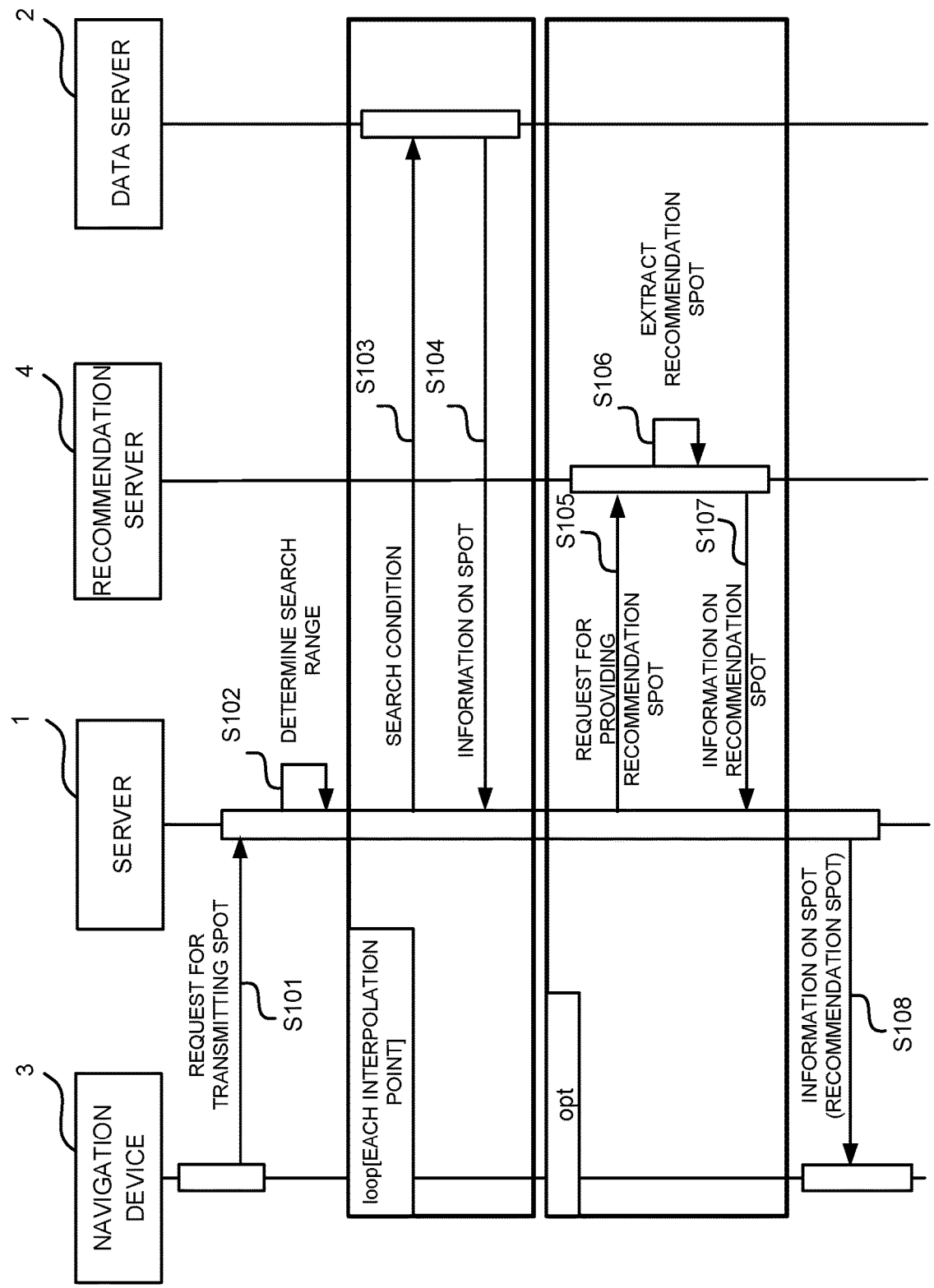
FIG. 16 is a sequence diagram (part 1) illustrating one example of processing of the first embodiment.
Figure 17:
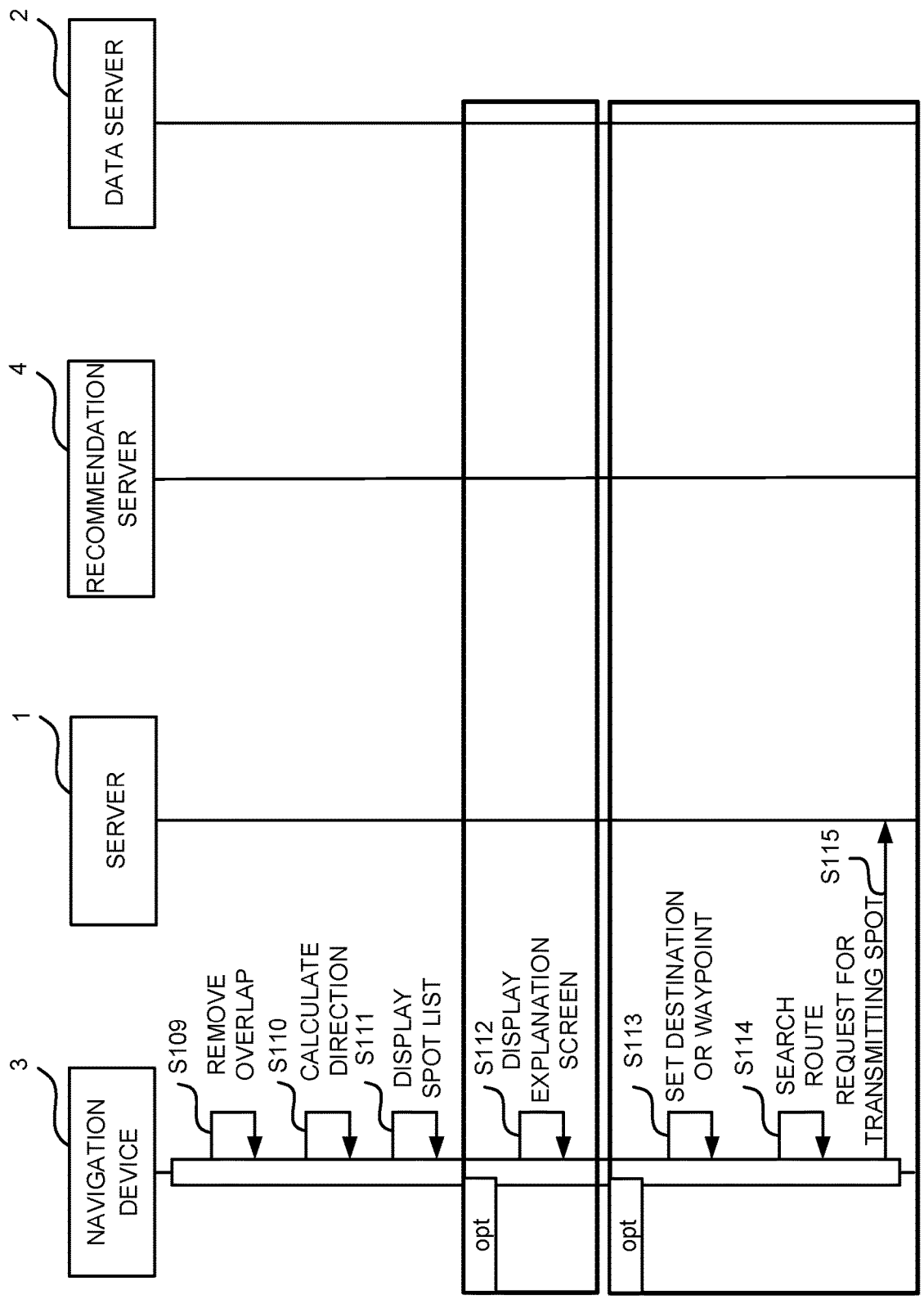
FIG. 17 is a sequence diagram (part 2) illustrating one example of the processing of the first embodiment.

FIG. 16 and FIG. 17 are sequence diagrams illustrating one example of the processing of the embodiment. The second transmission unit 32 of the navigation device 3, corresponding to the operation of the user, transmits the spot transmission request to the server 1 together with the information on the current position of the moving body mounting the navigation device 3, the position of the destination of the moving body, and the route from the current position to the position of the destination of the moving body (S101). The second transmission unit 32 of the navigation device 3, instead of corresponding to the operation of the user, may regularly transmits the spot transmission request to the server 1 together with the information on the current position of the moving body mounting the navigation device 3, the position of the destination of the moving body, and the route from the current position to the position of the destination of the moving body. The spot transmission request may be the transmission request for the recommendation spot. The information on the route includes the coordinates of the plurality of search starting points and the number of search starting points.

The determining unit 12 of the server 1, based on the information on the received current position of the moving body and the route from the current position of the moving body to the position of the destination, determines a plurality of search ranges around the route, which are different in width corresponding to the distance from the current position (S102). The search unit 13 transmits a query including the search conditions to the data server 2 (S103). Then, the search unit 13 receives the information on the spot corresponding to the search conditions from the data server 2 (S104). The search unit 13 searches for the spots present within the search range by the processing of S103 and S104. The search unit 13 repeats the processing of S103 and S104 for each search starting point (each search range).

When the first transmission unit 14 has received the transmission request for the recommendation spot from the navigation device 3, the first transmission unit 14 transmits the provision request for the recommendation spot together with the information on the searched spot, the user ID, the number of return requests of the spot, to the recommendation server 4 (S105). The extracting unit 42 of the recommendation server 4, based on the favorite spots for each user preliminarily stored in the third storage unit 44, the spot selected by the user, or the spot where the user has visited, extracts the recommendation spot from the searched spots (S106). The third transmission unit 43 transmits the information on the recommendation spot extracted by the extracting unit 42 to the server 1 (S107).

The first transmission unit 14 of the server 1 transmits the information on the spot or the information on the recommendation spot, which is transmitted from the recommendation server 4, to the navigation device 3 (S108). When the processing from S105 to S107 is not performed, the first transmission unit 14 transmits the information on the spot searched by the search unit 13 to the navigation device 3, and when the processing from S105 to S107 has been performed, the first transmission unit 14 transmits the information on the recommendation spot extracted by the recommendation server 4 to the navigation device 3. When the information on the recommendation spot is transmitted, the information on the spot in the following description is replaced with the information on the recommendation spot.

In FIG. 17, when the information on the received spot overlaps with the information on the spot that has already been received, the overlap removal unit 34 of the navigation device 3 removes the overlapped information (S109). The direction calculation unit 35 calculates the direction of the spot with respect to the route (S110). The display control unit 36 causes the second display 40 to display the list of the spot (S111). When the spot within the displayed list is selected by voice or the touch operation, the display control unit 36 causes the second display 40 to display the explanation screen including, for example, the address of the spot and the explanation, the event holding time (S112).

When the spot displayed on the second display 40 is selected as the destination or the waypoint by the user, the route search unit 37 sets the spot as the destination or the waypoint (S113). When the spot displayed on the second display 40 is set as the destination or the waypoint at S113, the route search unit 37 searches for a route again (S114). For example, when the spot displayed on the second display 40 is set as the destination, the route search unit 37 searches for a route from the current position to the spot. When the spot displayed on the second display 40 is set as the waypoint, the route search unit 37 searches for a route to reach the destination via the spot from the current position.

Then, the second transmission unit 32 transmits the spot transmission request together with the information on the current position of the moving body mounting the navigation device 3, the position of the destination of the moving body, and the route from the current position of the moving body to the position of the destination, to the server 1 (S115). After the processing of S115, the processing after S102 is executed again using the information transmitted at S115.

As described above, the server 1 determines the search ranges that are different in width corresponding to the distance from the current position to provide the spots within the search range to the navigation device 3. For example, since the search range becomes wide as the distance from current position becomes long and becomes narrow as the distance from current position becomes short, the search range is set so as not to include the range where the user is less likely to stop at. This enables the server 1 to shorten a search processing time of the spot and a data transmission time and provide the information on the spot where the user is highly likely to stop at. That is, the server 1 can provide the user with more appropriate information on the spot around the route and improve the efficiency of the processing in providing the information.

Second Embodiment

Figure 18:
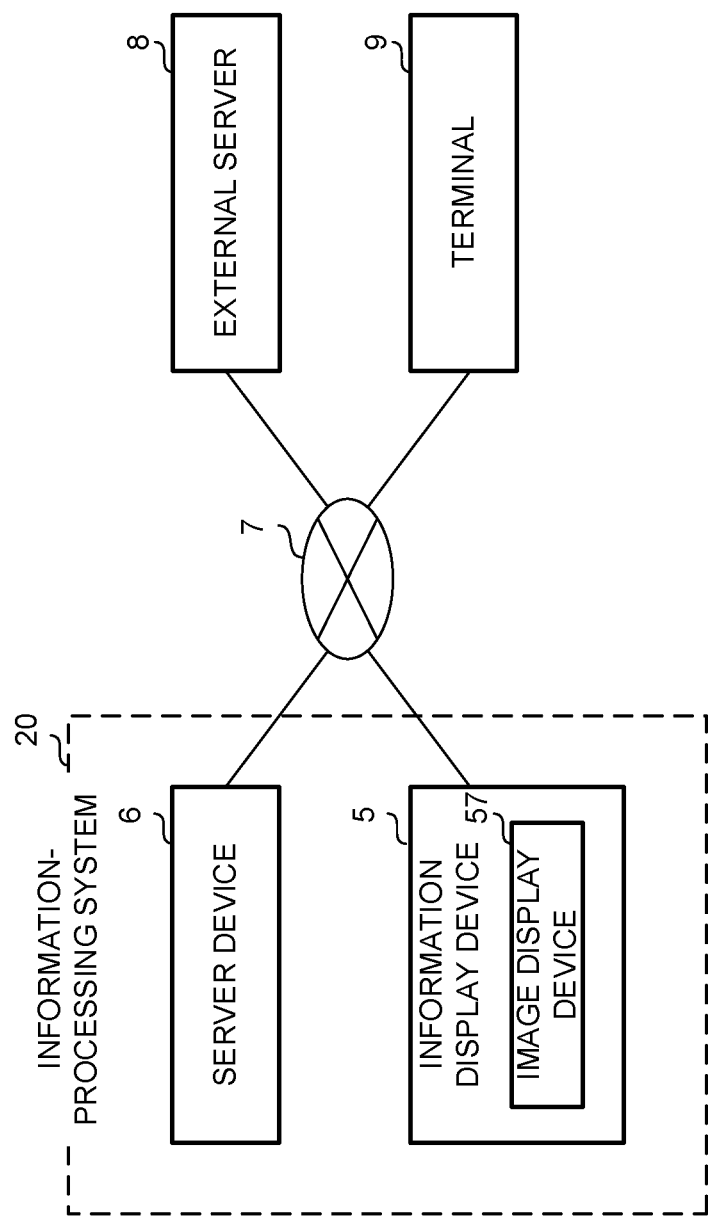
FIG. 18 is a drawing illustrating one example of a system where a second embodiment is used.

As shown in FIG. 18, a system of the second embodiment includes an information display device 5, a server device 6, an external server 8, and a terminal 9. The information display device 5 corresponds to, for example, the navigation device 3 of the first embodiment. Though not shown in the drawing, the information display device 5 includes, for example, the control unit 30 of the first embodiment. The server device 6 corresponds to, for example, the server 1, the data server 2, and the recommendation server 4 of the first embodiment. The server device 6, the information display device 5, the external server 8, and the terminal 9 are connected to, for example, a network 7. The network 7 includes, for example, the Internet or a public communication network. For example, the terminal 9 is connected to the network 7 via a wireless base station and a relay device. The terminal 9 can mutually communicate with the external server 8 via the network 7. The server device 6, for example, can mutually communicate with the information display device 5 and the external server 8 via the network 7.

The external server 8 is, for example, a server that provides a Social Networking Service (SNS). The SNS includes, for example, Twitter (registered trademark), FACEBOOK (registered trademark), INSTAGRAM (registered trademark), YouTube (registered trademark), and LINE (registered trademark). The SNS may be broadly interpreted and may include a blog or an electronic bulletin board. In the SNS, for example, posting information posted by a user is posted.

The terminal 9 is, for example, an information processing terminal used by a user that posts posting information to the SNS. The terminal 9 is, for example, a smart phone, a mobile phone, a tablet terminal, a personal computer, or a mobile computer. For example, the terminal 9 can access to the external server 8 to post the posting information to the SNS, by the operation of the user. The posting information includes at least a message. The message may include, for example, feelings or impressions of the poster relative to the spot. The spots indicate various points and places. The spot includes, for example, a restaurant, a tourist attraction, an occurrence point of an incident or an accident, or a traffic jam location. The terminal 9 may include, for example, an imaging device for imaging an imaging target. The imaging device is, for example, a camera. The posting information may include imaging data. The imaging data imaged by the imaging device may include, a still image or a moving image.

The terminal 9 may include, for example, a positioning sensor for measuring a position. The terminal 9 can add metadata to a still image or a moving image to be posted on the SNS by using the positioning sensor. The positioning sensor includes, for example, a Global Positioning System (GPS) sensor. The terminal 9 may use a plurality of mobile phone base stations to acquire the position information indicating the position of the terminal 9. The position information is represented by, for example, a latitude and a longitude. The metadata is one example of imaging position information. The imaging position information is information that indicates the position where a still image or a moving image is imaged. The position of the spot as posting target of the SNS may be identified by using, for example, the metadata included in the still image or moving image that is imaged. The meta data may include the information on an imaging time imaged by the imaging device. The terminal 9 provides the external server 8 with the message or the posting information including the message and the imaging data via the network 7.

The information display device 5 includes, for example, an image display device 57. It is possible to cause the image display device 57 to function as, for example, the first display 39 and the second display 40 of the first embodiment. The image display device 57 is, for example, configured to be able to display a map. The information display device 5 is held onto, for example, a moving body. The moving body is, for example, a vehicle. The vehicle includes, for example, an automobile, a motorcycle, a bicycle, and a snowmobile. The information display device 5 is, for example, a navigation device mounted on the vehicle. The moving body where the information display device 5 is held may be a human. In other word, the information display device 5 may be an information processing terminal held by a human. The information display device 5 is not limited to a navigation device. The information display device 5 may be, for example, a smart phone, a tablet terminal, and a mobile computer.

The information display device 5 may include, for example, a positioning sensor that is different from the positioning sensor of the terminal 9. The positioning sensor of the information display device 5 includes, for example, a GPS sensor. The terminal 9 uses the positioning sensor of the information display device 5 to acquire position information on the present location of the information display device 5. The position information is associated with, for example, a predetermined text tag. When performing a provision request to the server device 6, the information display device 5 transmits, for example, the position information on the present location.

The server device 6 collects, for example, the posting information posted on the SNS from the external server 8. The server device 6 analyzes the posting information to generate analysis information. The analysis information is, for example, vector information where the posting information posted on the SNS is analyzed and vectorized. The server device 6 identifies spot position information based on the posting information posted on the SNS. The spot position information is information that indicates the position of the spot. The spot position information is, for example, the coordinates where the spot resides.

The server device 6 associates the generated analysis information and the identified spot position information with one another to generate spot information.

The spot information is information on a specific place. The spot information is, for example, a Point of Interest (POI). The POI is, for example, information about a place that someone finds useful or a place in which someone is interested. Generating the spot information from the posting information posted on the SNS enables the server device 6 to reflect the information on a hot spot that excites people in the world in real time to the spot information.

In other words, the server device 6 can dynamically provide the user with fresh spot information corresponding to region or season. The spot information generated from the posting information posted on the SNS can dynamically provide the information, and thus may be referred to as a dynamic POI in one example. The dynamic POI means information that dynamically changes in a relatively short period of time, such as monthly, weekly, daily, hourly, or minutely. The server device 6 can also manage the dynamic POI by time, for example, by managing the collected posting information for each predetermined time zone.

The server device 6 provides the information display device 5 with the analysis information included in the spot information, for example, corresponding to the provision request from the information display device 5. The server device 6 may search for the spot information around the present location in the information display device 5 based on, for example, the position information on the present location transmitted from the information display device 5. The server device 6 provides the information display device 5 with the analysis information that is included in the spot information around the present location in the information display device 5, which is found by the search. The spot information around the present location is information that indicates one example of the spot information satisfying predetermined conditions with respect to the position indicated in the position information. The provision request is information that requests for providing the analysis information included in the spot information satisfying the predetermined conditions with respect to the position indicated in the position information in the information display device 5.

The server device 6 may search for the spot position information around the route from the present location to the destination, for example, corresponding to the provision request from the information display device 5. The server device 6 may provide the information display device 5 with, for example, the analysis information corresponding to the spot information, which is found by the search, around the route from the present location to the destination in the information display device 5. The server device 6 may provide the information display device 5 with, for example, the analysis information corresponding to the spot information that is found by the search and resides within a predetermined distance from the route from the present location to the destination in the information display device 5. The server device 6 may transmit, for example, the analysis information corresponding to the spot information that is found on the route and resides within the predetermined distance from the route from the present location to the destination in the information display device 5, to the information display device 5. The spot information present within the predetermined distance from the route from the present location to the destination is information that indicates one example of the spot information satisfying the predetermined conditions with respect to the position indicated in the position information. The server device 6, similarly to the first embodiment, may transmit the analysis information present in the search range illustrated in FIG. 9 to FIG. 15, in the route from the present location to the destination, to the information display device 5.

The information display device 5 can cause the image display device 57 to display the analysis information that is included in the spot information provided from the server device 6. The information display device 5, for example, can cause the analysis information included in the spot information around the present location to be displayed in a superimposed manner on a map. The information display device 5, for example, can cause the analysis information included in the spot information present within the predetermined distance from the route from the present location to the destination in the information display device 5 to be displayed in a superimposed manner on the map. The information display device 5 can cause the analysis information within the search range illustrated in FIG. 9 to FIG. 15 to be displayed in a superimposed manner on the map, in the route from the present location to the destination.

Now, the user may operate the terminal 9 to, for example, post a message about the features of the spot to the SNS provided by the external server 8. The message is one example of the posting information posted on the SNS. The message about the features of the spot is, for example, a message including the feelings of the poser to the spot. When the message representing the feelings of the poster is posted, the server device 6 collects the posting information representing the feelings from the external server 8 and analyzes the collected posting information to generate the analysis information. The server device 6 can generate the spot information including the analysis information about the feelings from the generated analysis information to provide the information display device 5 with the spot information.

However, the posting information about the features of the spot is posted in chronological order regardless of the position of the spot. Even when the message is posted on the SNS regardless of the position of the spot, the user may want to confirm the posting information at the actual position of the spot. When the user wants to confirm the posting information at the position of the spot, the user of the information display device 5 may need to search again using, for example, the spot name as a keyword.

When accepting the provision request for the analysis information from the information display device 5, the server device 6, for example, provides the information display device 5 with the spot information on the spot near the present location of the information display device 5. The information display device 5 displays the analysis information included in the spot information provided from the server device 6 in a superimposed manner on the map. The analysis information includes, for example, the feelings of the poster at the spot. Thus, the information display device 5 can notify the feelings of other users to the spot. The server device 6, for example, extracts the spot information including imaging information on still images or moving images, from the spot information corresponding to the spot. Then, the server device 6 may provide the information display device 5 with the extracted spot information.

The following describes the information processing system 20 according to the embodiment in detail.

Figure 19:
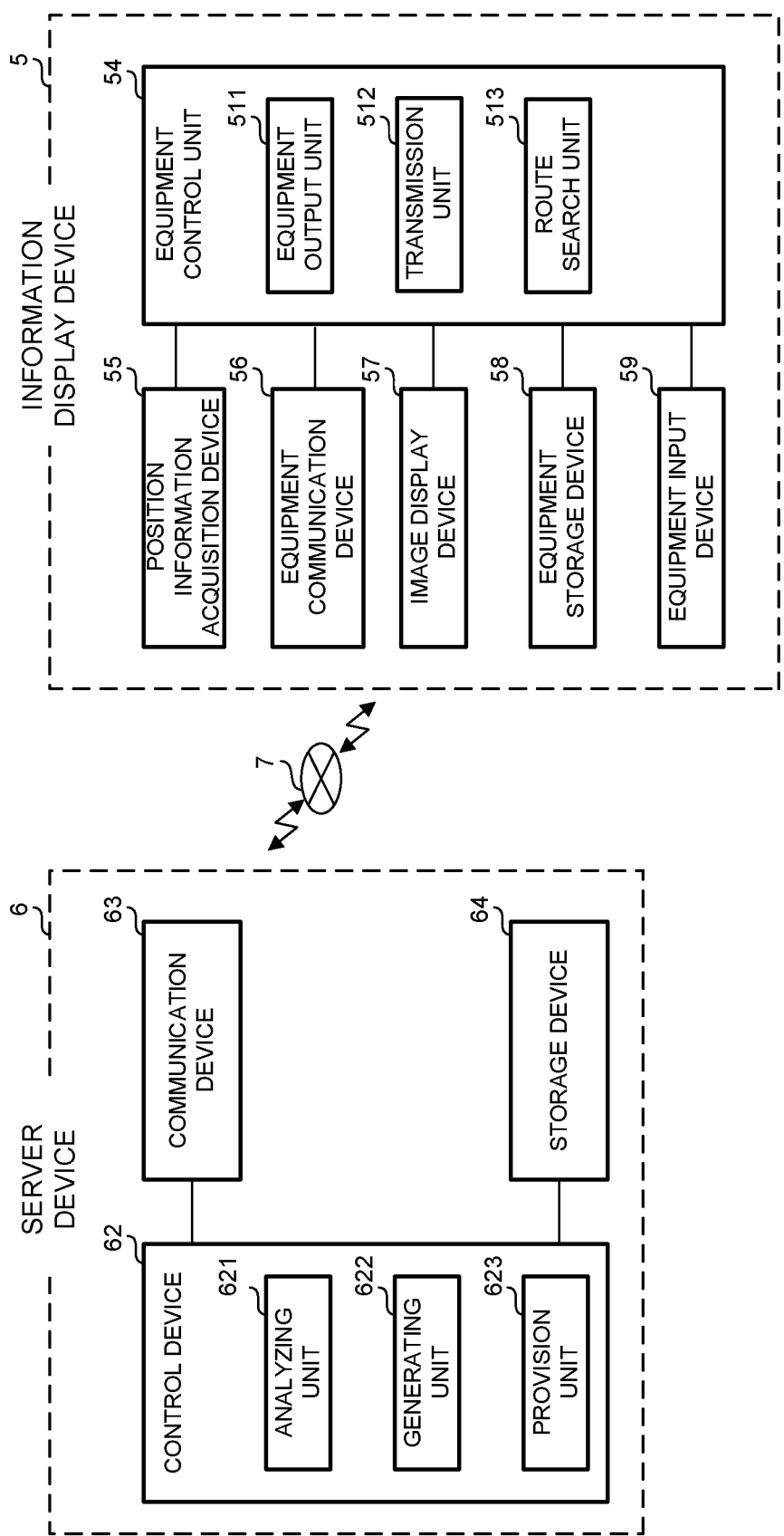
FIG. 19 is a drawing illustrating an information-processing system according to the second embodiment.

The information processing system 20, as shown in FIG. 19, includes, for example, the server device 6 and the information display device 5.

The server device 6 includes, for example, a control device 62, a communication device 63, and a storage device 64.

The control device 62 controls, for example, the communication device 63. The control device 62, for example, controls and connects the communication device 63 to the network 7. The control device 62, for example, may control the communication device 63 so that data can be transmitted and received to and from the information display device 5 or the external sever 8.

The control device 62 controls and causes the communication device 63, for example, to receive a spot search request requesting the search for a predetermined spot from the information display device 5. The spot search request includes, for example, the information on the present location of the moving body including the information display device 5, the destination, and the route from the present location to the destination. The control device 62, for example, corresponding to the spot search request, searches for the spots in the periphery along the route from the present location to the destination. The control device 62 controls and causes the communication device 63, for example, to transmit the spot information found by the search to the information display device 5.

The control device 62 includes, for example, an analyzing unit 621, a generating unit 622, and a provision unit 623. The analyzing unit 621, for example, acquires the posting information posted on the SNS from the external server 8, via the communication device 63. In the SNS, for example, a service that provides the posting information posted via an Application Programming Interface (API) is provided. The analyzing unit 621 can acquire the posting information from the external server 8 by using, for example, the API.

The analyzing unit 621 collects the message about the spot posted on the SNS as the posting information. The analyzing unit 621 analyzes the posting information to generate the analysis information. The analyzing unit 621 may use compressed information where the posting information posted by the user on the SNS is compressed as the analysis information. The compressed information means, for example, information the size of which is reduced while maintaining the information amount of the original posting information by using a compression algorithm. The analyzing unit 621 may use vector information where the posting information posted on the SNS is analyzed and vectorized as the analysis information. The vector information, for example, can be classified according to the posting information. The classification corresponds to, for example, the feelings of "happy", "delicious", "impressed", "surprised", and "healed." The vector information can be also said to be the analysis information where the posting information posted on the SNS is analyzed.

The analyzing unit 621 may identify a score where a degree of recommendation of the spot of the posting information posted on the SNS is scored. The score is information where the degree of recommendation of the spot of the posting information posted on the SNS is scored. The analyzing unit 621, for example, performs morphological analysis on the posting information posted on the SNS to acquire a morpheme. The analyzing unit 621 may use a result of scoring the spot information as a score, corresponding to a characteristic word identified based on the acquired morpheme. The server device 6, based on the score of the spot information scored by the analyzing unit 621, can prioritize a plurality of pieces of the spot information. For morphological analysis, for example, MeCab can be used.

The analyzing unit 621, for example, executes processing of extracting a key phrase from the posting information posted on the SNS. The analyzing unit 621, for example, executes processing of extracting the characteristic word from the posting information posted on the SNS. The characteristic word is, for example, a term characterizing the message included in the posting information, which is posed. The characteristic word includes an emotional word. The emotional word is, of the characteristic words, a term that particularly expresses the feelings and impressions of the poster that has posted. The emotional word includes the terms, for example, "glad", "sad", and "risky." The emotional word may be, for example, a symbol such as " . . . " that represents the feeling of the poster in the message of the posting information such as "Is Route 43 congested?" The key phrase is, for example, a characteristic phrase that represents a subject of the posting well. In the extraction processing of the key phrase, the analyzing unit 621 extracts a "phrase" that includes consecutive multiple words and means a phrase, instead of a "word" that means a word.

The analyzing unit 621 can extract a key phrase using, for example, a preliminarily created dictionary of key phrases. The analyzing unit 621 can also extract a key phrase using, for example, a machine learning. The analyzing unit 621 can also extract a key phrase, for example, on a statistical basis or a graph basis. The analyzing unit 621 can extract a characteristic word using, for example, a preliminarily created dictionary of characteristic words. The analyzing unit 621 can extract a characteristic word using, for example, a machine learning. The analyzing unit 621 can also extract a characteristic word, for example, on a statistical basis or a graph basis. The analyzing unit 621 may execute processing of extracting a key phrase and a characteristic word, from the posting information posted on the SNS.

The analyzing unit 621, for example, may classify the analysis information, which is generated by analyzing the posting information posted on the SNS, into predetermined categories. As the predetermined categories, the analyzing unit 621 classifies into, for example, news, hot spring, park, museum, shrine, live concert, shopping, amusement, outdoor, event, gourmet, ramen, and mountain. The categories may include any classification. The categories may be classified into appropriate types. The categories may be classified corresponding to the type of feelings. In other words, the analyzing unit 621 classifies the analysis information into the categories corresponding to the type of posting information posed on the SNS.

The analysis information may include, for example, metadata. The metadata is, for example, a text tag including text data. The text tag is used, for example, to classify the analysis information into each predetermined category. In other word, the analysis information is configured such that the posting information can be managed by classifying the posting information into each category by the text tag. The analyzing unit 621 is configured such that the message written by the user to the external server 8 can be collected from the external server 8. The analyzing unit 621 can be said to be an information acquiring unit that acquires SNS information from the external server 8.

The generating unit 622 generates the spot information. In the spot information, the analysis information and the spot position information are associated with one another. The generating unit 622 causes the storage device 64 to store the generated spot information.

When having accepted the provision request for the analysis information from the information display device 5, the provision unit 623 controls the communication device 63 to provide the information display device 5 with the analysis information included in the spot information. For example, when having accepted the provision request for the spot information from the information display device 5, the provision unit 623 may control the communication device 63 to provide the information display device 5 with the analysis information included in the spot information. For example, when having accepted the provision request for the analysis information on the spot belonging to a predetermined category, the provision unit 623 may provide the information display device 5 with the requested analysis information on the spot belonging to the predetermined category. In this case, the analysis information requested to provide is, for example, the posting information on the predetermined category corresponding to the spot. When there are a plurality of pieces of analysis information of the spot belonging to the predetermined category, the analyzing unit 621 may provide the information display device 5 with the plurality of pieces of analysis information.

The storage device 64 stores, for example, various kinds of pieces of information on the processing of the server device 6. The storage device 64 stores, for example, point name information 10A shown in FIG. 20 and spot management information 10B shown in FIG. 21. The storage device 64 may store, for example, map information and category information. In other words, the storage device 64 can be configured to include the first storage unit 15, the third storage unit 44, and the storage unit of the data server 2, of the first embodiment.

Next, the information display device 5 includes an equipment control unit 54, a position information acquisition device 55, an equipment communication device 56, the image display device 57, an equipment storage device 58, and an equipment input device 59. The equipment control unit 54 controls, for example, the position information acquisition device 55, the equipment communication device 56, the image display device 57, the equipment storage device 58, and the equipment input device 59 of the information display device 5. The equipment control unit 54 includes, for example, an equipment output unit 511, a transmission unit 512, and a route search unit 513. Although not shown in the drawings, the equipment control unit 54 may include, for example, the setting unit 31 of the first embodiment. The equipment output unit 511, for example, output the spot information provided from the provision unit 623 of the server device 6 to the image display device 57. For example, the equipment control unit 54 controls the equipment communication device 56 so as to connect to the network 7. The equipment control unit 54, for example, controls the equipment communication device 56 so as to transmit and receive the data to and from the server device 6. The equipment control unit 54 may control the equipment communication device 56 so as to transmit and receive the data to and from the external server 8 or terminal 9, in addition to the server device 6.

The equipment storage device 58 stores, for example, various kinds of pieces of information on the processing of the information display device 5. The equipment storage device 58 may store, for example, map information. The equipment control unit 54, for example, causes the image display device 57 to display the map indicated by the map information stored in the equipment storage device 58. The equipment storage device 58, for example, can be configured to include the second storage unit 38 of the first embodiment.

The position information acquisition device 55 acquires the position information indicating the position of the information display device 5, for example, by using a positioning sensor, or by using a plurality of mobile phone base stations. The position information acquisition device 55 can acquire the position information, for example, based on information from a GPS sensor. The position information is, for example, information that indicates a geographical position of the spot. The position information is, for example, represented by a latitude and a longitude. The position information may include altitude information, in addition to the latitude and the longitude. Time information for identifying the latitude and the longitude may be added to the position information. The position information acquisition device 55 may acquire the position information indicating the position of a point other than the information display device 5. The position information acquisition device 55, for example, may acquire the position information indicating the position on the map displayed by the image display device 57. The position on the map may be the center of the map and may be a specific point of the map.

The equipment control unit 54, for example, controls the position information acquisition device 55 to acquire the position information indicating the present location of the equipment control unit 54. The equipment control unit 54, for example, causes the icon information indicating the present location to be displayed on the map displayed by the image display device 57, based on the position information acquired from the position information acquisition device 55. The present embodiment describes the example where the position information acquisition device 55 acquires the position information indicating the present location of the moving body on which the information display device 5 is mounted. The present embodiment is not limited to the example where the position information acquisition device 55 acquires the position information on the moving body.

The equipment input device 59 is, for example, a device that accepts an input to the information display device 5 by a user. The equipment input device 59 is, for example, an input key, a button, a keyboard, a pointing device, a microphone, or a touch panel. In the information display device 5, a search instruction for a route to a destination is entered by a user via the equipment input device 59. In the information display device 5, the route search unit 513 of the equipment control unit 54 searches for the route from the present location to the destination using, for example, a Dijkstra method. in other words, the route search unit 513 has a function similar to the route search unit 37 of the first embodiment. The equipment control unit 54, for example, controls and causes the image display device 57 to display the searched route from the present location to the destination in a superimposed manner on the map. For example, when the search instruction for a route where a waypoint is designated in addition to the destination is entered via the equipment input device 59, the equipment control unit 54 causes the route search unit 513 to search for the route via the waypoint. The equipment control unit 54 may request the search for the route from the present location to the destination from the server device 6 and acquire the searched route from the server device 6. When acquiring the route corresponding to the search request for the route from the equipment control unit 54, the server device 6 may include a function similar to that of the route search unit 513.

The equipment communication device 56, for example, may transmit the spot search request to the server device 6. The equipment communication device 56 may receive the spot information that is transmitted from the server device 6 corresponding to the spot search request and indicates the spot in the periphery along the route. The spot search request, for example, includes the present location acquired by the position information acquisition device 55. The spot search request may include, for example, the destination or the route from the present location to the destination, in addition to the present location. The equipment control unit 54, for example, controls and causes the image display device 57 to display the analysis information where the posting information on the spot indicated by the received spot information is analyzed, on the map.

As described above, in the embodiment, the spot information is, for example, generated based on the message posted on the SNS provided by the external server 8. For example, when posting information regarding features representing a spot is posted on the SNS provided by the external server 8, the server device 6 analyzes the posting information to identify the analysis information. The identified analysis information shows the analysis result of the features representing the spot. The server 1 generates the spot information where the analysis information and the identified spot position information based on the posting information are associated with one another. The features representing the spot is, for example, the impression of the poster.

For example, when receiving the spot information from the server device 6, the equipment control unit 54 causes the image display device 57 to display the spot information in a superimposed manner on the map. For example, when, of the plurality of pieces of the spot information displayed on the image display device 57, a user selects the specific spot information, the equipment input device 59 accepts the selection of the user. The image display device 57 can display the analysis information on the spot information selected by the user with the equipment input device 59. The image display device 57 can display the image or video of the spot that is the target of the posting information together with the analysis information. When there is one piece of spot information, or when the number of spot information is equal to or less than a optionally set number, the image display device 57 may display the analysis information included in the spot information provided from the server device 6 without accepting the selection of the user. The optional number can be set to, for example, any number from 1 to 10.

The analysis information on the spot is displayed on the map corresponding to the spot position information that satisfies the predetermined conditions with respect to the position indicated in the position information. The analysis information on the spot is displayed on the map corresponding to the position in the spot information around the present location of the information display device 5. The analysis information on the spot is displayed, for example, on the map existing within a predetermined distance from the route from the present location to the destination of the information display device 5.

The following describes the hardware configuration of the second embodiment. The hardware configuration of the server device 6 is similar to the hardware configuration of the first embodiment shown in FIG. 5.

The storage device 64 of the server device 6 shown in FIG. 19 is achieved, for example, by the memory 112, the auxiliary storage unit 113, or the portable recording medium 118. The control device 62, the analyzing unit 621, the generating unit 622, and the provision unit 623 of server device 6 shown in FIG. 19 are achieved, for example, by the processor 111 executing the information processing program loaded in the memory 112. The communication device 63 of the server device 6 shown in FIG. 19 is, for example, the communication interface 114.

The server device 6 does not have to include all the components shown in FIG. 5. Some the components shown in FIG. 5 may be omitted from the server device 6. The server device 6 may be connected to the external devices to use the components inside the external devices, instead of the components of the server device 6. In other words, the server device 6 may achieve each process or function by centralized processing by a single device or a single system, or by distributed processing by a plurality of devices or a plurality of systems.

The information display device 5, the external server 8, and the terminal 9 may include configuration similar to the configuration shown FIG. 5. The information display device 5, the external server 8, and the terminal 9 do not have to include a part of the configuration shown FIG. 5, or alternatively, may include a further configuration. The information display device 5 may include, for example, a GPS sensor for measuring the position. The information display device 5, the external server 8, and the terminal 9 each may achieve each process or function by centralized processing by a single device or a single system, or by distributed processing by a plurality of devices or a plurality of systems.

The equipment storage device 58 of the information display device 5 is achieved, for example, by the memory 112, the auxiliary storage unit 113, or the portable recording medium 118 shown in FIG. 5. The equipment control unit 54, the equipment output unit 511, the transmission unit 512, and the route search unit 513 are achieved, for example, by the processor 111 executing the information processing program loaded in the memory 112 shown in FIG. 5. The equipment communication device 56 is, for example, the communication interface 114 shown in FIG. 5.

Subsequently, the information stored in the storage device 64 of the server device 6 will be illustrated. The storage device 64 may store, for example, map information. The map information is, for example, the numerical map created by the Geographical Survey Institute of Japan. In the numerical map, for example, the road network is represented by nodes and links. The node is, for example, a curve of a road, an intersection, or other points arranged at a nodal point on the road network representation. The link is, for example, a line segment that represents a road connecting the nodes.

The storage device 64, for example, stores category information. The category information is, for example, information where a category for classifying the posting and a word belonging in the category are associated with one another. The control device 62 can identify the category of the posting information, for example, by determining the category associated with the word included in the message posted as the posting information in the category information.

The storage device 64 stores, for example, the point name information 10A shown in FIG. 20. In the point name information 10A, for example, the point name and the spot position information are associated with one another and registered together. The point name is, for example, information that indicates the name of the spot. The spot position information is, for example, information that indicates the position of the point corresponding to the spot. The point name is, for example, an address, a municipality name, a store name, a building name, or a facility name. The position information is represented by, for example, a latitude and a longitude. The point name information 10A may be included in the map information.

The storage device 64 stores, for example, the spot management information 10B shown in FIG. 21. In the spot management information 10B, for example, the spot information generated by the generating unit 622 is stored. The spot information stored in the spot management information 10B may include the analysis information analyzed by the analyzing unit 621. In the spot management information 10B in FIG. 21, for example, spot names, spot position information, analysis information, categories, media information, date and time information, and the spot information associated with the scores are registered.

The spot name of the spot management information 10B is, for example, the name of the spot that corresponds to the posting information posted on the SNS. In other words, the spot name is the name of the spot of the posting target.

The media information is, for example, information on the media included in the posting of the SNS. The media information includes, for example, a still image, a moving image, and voice information. The date and time information is information indicating the date and time when the posting information is posted on the SNS. When the date and time information is included in the spot management information 10B, for example, causing the storage device 64 to store only the spot information having date and time information within a predetermined time period from the current time enables providing the information display device 5 with only the latest information as the spot information. In the example of the spot management information 10B shown in FIG. 21, the spot name of the spot "N ramen" is registered. As the analysis information generated by analyzing the posting information on the spot "N ramen", "N ramen" and "delicious" are registered.

When a plurality of pieces of spot information are stored in the spot management information 10B, the server device 6, based on the score, can prioritize the plurality of pieces of spot information registered in the spot management information 10B to present the plurality of pieces of spot information to the user.

The spot information registered in the spot management information 10B is not limited to the spot information that includes ae spot name, spot position information, analysis information, a category, media information, date and time information, and information including a score, and may include other information. For example, the information on the name and address corresponding to the spot may be included in the spot management information 10B. In addition to the name and address corresponding to the spot, the telephone number of the spot may be included in the spot management information 10B. The Uniform Resource Locator (URL) corresponding to the spot may be included in the spot management information 10B. The information identical to the posting information may be included in the spot management information 10B. In the analysis information, for example, a hash tag attached to the message posted on the SNS may be included. In the spot management information 10B, for example, the POI information indicating the POI preliminarily included in the map information may be merged with the generated posting information.

In the spot management information 10B, for example, the information on the favorite spot preliminarily registered by the user or the spot where the user has visited may be included in association with the user.

Figure 22:
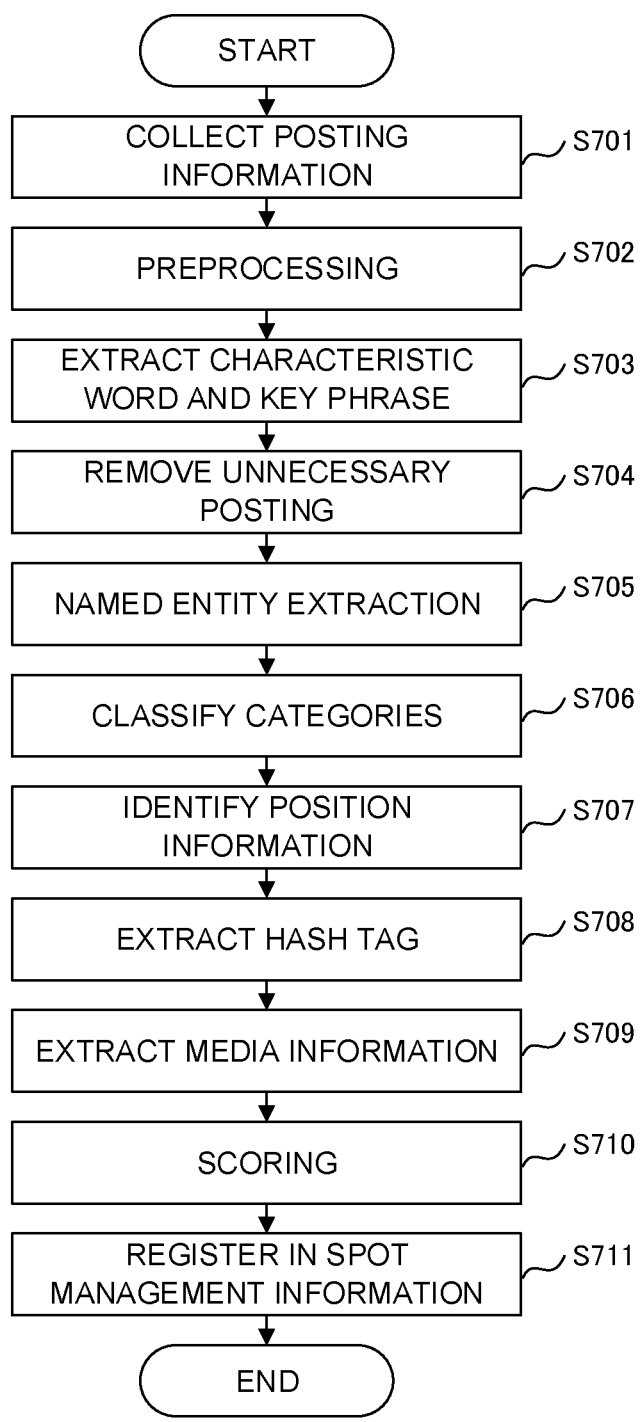
FIG. 22 is a drawing illustrating an operational flow of generation processing of spot information according to the second embodiment.

The following describes generation processing of the spot information generated by the server device 6 by using FIG. 22.

In the server device 6, for example, when an execution instruction of the generation processing of the spot information is entered, the control device 62 starts the operational flow in FIG. 22.

At S701, the control device 62 collects the posting information posted on the SNS from the external server 8 via the communication device 63. The control device 62 may collect all the posting information from the external server 8 or may collect some posting information. Some posting information includes, for example, the latest posting posted during the most recent predetermined time period or the posting information on the position of the name of the district municipality. The control device 62, for example, may acquire a specific point name from the point name information 10A to collect only the posting information on the acquired point name from the external server 8.

At S702, the control device 62 executes preprocessing on the collected posting information. The preprocessing includes, for example, a line break included in the posting or processing to delete a URL. The preprocessing may include, for example, processing to convert full-width alpha numeric characters to half-width, data normalization, or cleansing processing. Furthermore, the preprocessing may include, for example, processing to perform morphological analysis on the posting to divide the posting into morphemes.

At S703, the control device 62 executes the processing of extracting a characteristic word and a key phrase from the posting. In the processing at S703, the control device 62, for example, operates as the analyzing unit 621.

At S704, the control device 62 executes processing of removing an unnecessary posting. For example, the tweet such as "I'm at . . . " posted in checking in to a hotel may be removed because it is highly likely to be less useful to others.

At S705, the control device 62 executes named entity extraction (NER: Named Entity Recognition) processing. For the named entity extraction processing, for example, GINZA is used. For example, the control device 62 can label the sentence by executing the named entity extraction processing on the posting information that has undergone the morphological analysis. The type of label includes the following.

Date: Oct. 17, 2019
Event: ○○ fireworks display
Site: ○○ prefecture ○○ city
Amount of Money: 780 yen
Number: about 100 people
Organization/Group: Fireworks Execution Committee
Others: Typhoon No. 19
Person: Such as Personal Name
Commodity: Pasta with Spring Vegetables
Time: 18:00 to 19:00

Figure 23:
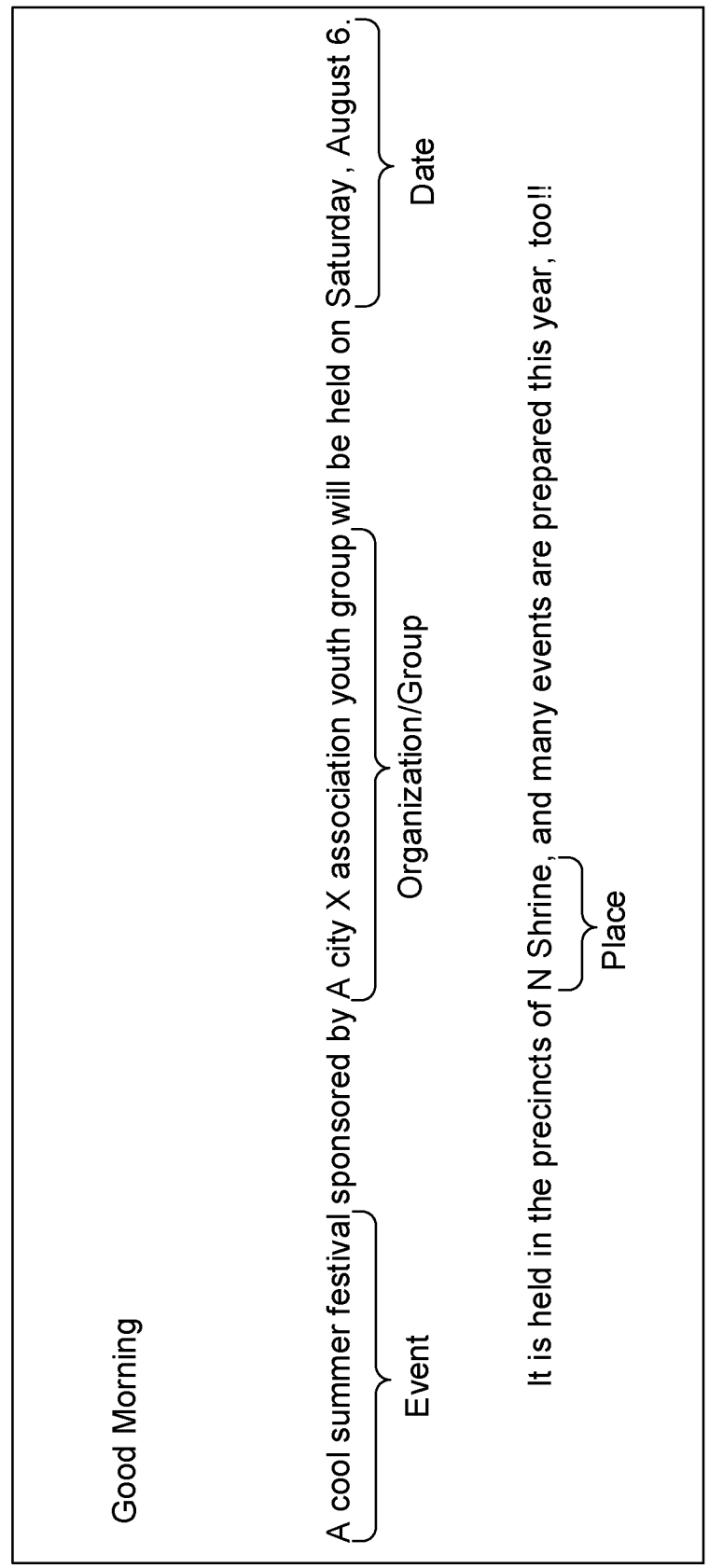
FIG. 23 is a drawing illustrating an execution result of named entity extraction to a message.

By the named entity extraction, the control device 62 can extract, for example, a proper noun indicating a point name that appears in the posting information and date and time information indicating a date and time. As shown in FIG. 23, the control device 62 executes labeling the terms included in the posting information, such as "organization/group", "event." In the processing of S705, the user may further correct the labeling given by the named entity extraction. In another embodiment, the control device 62 may execute labeling by machine learning. By using labels added to the posting information by the named entity extraction, the control device 62 can execute analysis based on the meaning of the posting information, such as "menus served at some store", or "a product", or "when will it start?" For example, the term "risky" may be used with different meanings even for the identical term whether "it was the delicious meal." or "it is the state of getting stuck by something." For example, when the term to which a label of a place is added by the named entity extraction represents a restaurant, the control device 62 can classify the meaning of the term "risky" into the meaning of "delicious." The named entity extraction using the machine learning, after dividing the posting information into an appropriate analysis unit, can summarize the posting information as one or a plurality of analysis units forming a named entity, and concurrently determine which kind of named entity the summarized analysis unit sequence is. By performing the named entity extraction, the control device 62 can add the meaning to perform the meaningful extraction, such as "menu served at some store", or "a product", or timing of "when will it start?" The control device 62 can perform the named entity extraction by associating the posting information on a plurality of pieces of SNS information with one another.

At S706, the control device 62 classifies the categories of the posting information. The control device 62 refers to the category information stored in the storage device 64 to identify the category associated with the word included in the posting information. The control device 62 may identify the category of the posting by using the machine learning. The category of the posting information may include the classifications identical to the categories of the above-described spot or may include the following classifications.

News
Activity
Event
Café/Teahouse
Shopping
Museum
Leisure
Restaurant
Personal Experience
Park/Garden
Zoo/Aquarium
Lodging
Not Applicable
Tavern/Bar
Landscape/Famous Place
Hot Spring/Spa/Beauty Salon
Shrine/Temple At S707, the control device 62 identifies the position information indicating the position of the terminal 9 to which the SNS is posted. For example, the control device 62 identifies the spot name and the position information from the posting information that is posted. For example, by using the morpheme acquired as a result of the morphological analysis, the control device 62 searches the point name information 10A stored in the storage device 64. When the point name corresponding to the morpheme is found, the control device 62 identifies the point name, which is found, as the spot position information. The control device 62, for example, identifies the point name, which is found, as the spot name. The control device 62, for example, may identify the spot name based on the content of the posting information. For example, when the posting information has the content on an incident or a traffic jam, as the spot name, it may be preferable to use the content of the incident or the information indicating the occurrence of the traffic jam as the spot name rather than using the point name. The control device 62 may determine the information to use as the spot name corresponding to the content of the posting, such as the category of the posting. For example, when a still image or a moving image is included in the posting information, the control device 62 may identify the position information indicating the position of the terminal 9 from the imaging position information on the metadata included in the still image or the moving image.

The morpheme used for the search for point name information 10A may be one or may be equal to or more than two. The control device 62 may extract a co-occurrence word that co-occurs from two or more words and may perform the search by replacing the co-occurrence word with a search word having high degree of similarity with the word preliminarily clustered for each spot. Here, the co-occurrence means that a predetermined word included in the posting information simultaneously appears with another word in the posting information. The co-occurrence word means another word that simultaneously appears with the predetermined word. The control device 62 may identify the spot name and the spot position information that correspond to the posting by using the machine learning. In another embodiment, the control device 62 may execute the search for the point name information 10A by using the term where the label of the place is added by the named entity extraction as the spot name.

At S708, when the posting information includes a hash tag, the control device 62 extracts the hash tag from the posting. At S709, when the posting information includes media information, the control device 62 extracts the media information from the posting.

At S710, the control device 62 executes scoring the posting information. For example, regarding the date and time of the posting, the control device 62 gives a score such that the score is higher as the posting is temporally newer. For example, regarding the content of the posting information, the control device 62 gives the posting having a positive content a higher score than a posting having a negative content. For example, regarding the hash tag of the posting, the control device 62 gives a higher score to the case where the hot word is included than to the case where the hot word is not included. For example, regarding the media information of the posting, the control device 62 gives a score such that the score is higher as the posting has a higher aesthetic feeling. The aesthetic feeling can be evaluated, for example, by using resolution. In other words, the control device 62 gives a score such that the score is higher as the resolution is higher. The control device 62 determines a score to the posting, for example, by totaling the scores of the date and time of the posting, the content of the posting information, the hash tag, and the media information. The control device 62 may calculate, for example, a statistic of an average value, a median, a mode, a maximum value, or a minimum value of a plurality of scores, and use the calculation result as the score. It can be said that the score represents, for example, the utility value of the posting. The control device 62 generates the spot information that corresponds to the posting by using the processing information acquired by the various kinds of processing of the extraction of the characteristic word and key phrase, the named entity extraction, the classification of categories, the identification of the information on the position, the extraction of the hash tag, and the scoring.

At S711, the control device 62 registers the generated spot information in the spot management information 10B, and the operational flow terminates. The control device 62 registers, for example, the spot information including the information on the spot management information 10B illustrated in FIG. 21. When registering the spot information in the spot management information 10B, the control device 62 may rearrange the spot information based on the scores determined at S710 to register in the spot management information 10B. Rearranging the spot information based on the scores enables the information processing system 20 to provide the user with the highly useful spot information efficiently. In the processing at S711, the control device 62 operates, for example, as the generating unit 622.

The information included in the spot information is not limited to the example shown in FIG. 21 and may omit some information or may include the additional information separately. For example, the control device 62 may include the information on the date and time of the posting on the SNS and the hash tag used for generating the spot information in the spot management information 10B.

For example, because a plurality of pieces of posting information are posted with respect to one spot, the control device 62 may, for example, summarize the plurality of pieces of posting information with respect to the identical spot as one piece of spot information to register in the spot management information 10B. The control device 62 can determine whether the posting information is for the identical spot or not, by using the information of, for example, the spot name, the position information, the category, and the date and time information.

According to the operational flow in FIG. 22, when the posting information on the feature of the spot is included in the posting information collected from the external server 8, the server device 6 generates the analysis information including the feature of the spot. The server device 6 can generate the spot information where the spot position information identified based on the posting information and the generated analysis information are associated with one another to register the spot information in the spot management information 10B.

Immediacy may be required for the posting categorized as news, such as the posting regarding a traffic jam and the posting regarding an incident. It may be preferable to provide the user with the posting as quickly as possible. In one embodiment, some processing in FIG. 22 may be omitted in generation of the spot information that corresponds to the posting categorized as news. For example, the processing of the named entity extraction at S705 may be omitted in generation of the spot information that corresponds to the posting categorized as news.

Subsequently, the following describes an example of providing information on the spot registered in the spot management information 10B. for example, in response to the provision request from the information display device 5, the server device 6 provides the analysis information included in the spot information that matches the requested conditions. The spot information includes, for example, the information that requires immediacy, for example, the information on traffic jams and news about an incident, or the information that has a time limit to the preferable timing to present to the user. For example, if the information on the traffic jam is provided to the user after the traffic jam is resolved over time, incorrect information will be provided to the user. Thus, when providing the analysis information included in the spot information that matches the requested conditions in response to the request for providing the information on the spot from the information display device 5, the control device 62 of the server device 6 may set a limit on a period of provision corresponding to the type of information. For example, for the information on the traffic jam, the control device 62 may provide the information display device 5 with the analysis information, based on the posting information posted on the SNS within a predetermined time from the time when the control device 62 accepted the request for providing the analysis information. It is only necessary that the predetermined time is appropriately set as, for example, 1 hour, 2 hours, or 3 hours.

When receiving the analysis information provided from the server device 6, the information display device 5, for example, causes the image display device 57 to display the icon of the spot that corresponds to the analysis information on the map displayed on the image display device 57.

Figure 24:
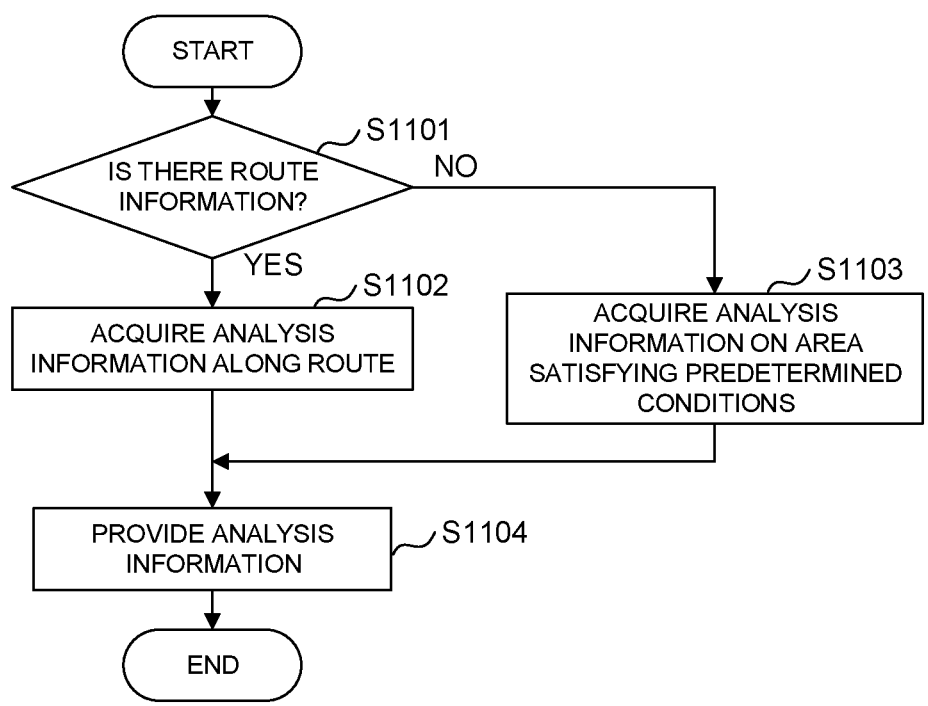
FIG. 24 is a drawing illustrating an operational flow of provision processing of posting information according to the second embodiment.

The following illustrates the operational flow of the provision processing of the analysis information executed by the control device 62 of the server device 6 according to the embodiment in FIG. 24. For example, when the communication device 63 accepts the provision request for the analysis information from the information display device 5, the control device 62 starts the operational flow in FIG. 24.

At S1101, the control device 62 determines whether the accepted provision request includes the route information or not. When the accepted provision request includes the route information (YES at S1101), the flow proceeds to S1102.

At S1102, the control device 62 acquires the analysis information along the route from the present location to the destination of the information display device 5, from the spot management information 10B. The control device 62, for example, acquires the analysis information that has been found by the search and corresponds to the spot information present within a predetermined distance from the route from the present location to the destination of the information display device 5, from the spot management information 10B. The analysis information on the spot management information 10B may be, for example, the vector information preliminarily vectorized by the analyzing unit 621 at a predetermined timing.

At S1101, when the provision request does not include the route information (NO at S1101), the control device 62 advances the flow to S1103.

At S1103, the control device 62 acquires the analysis information included in the spot information around the present location of the information display device 5, from the spot management information 10B. The control device 62, for example, acquires the analysis information included in the spot information that satisfies the predetermined conditions with respect to the position indicated by the position information on the information display device 5, from the spot management information 10B.

At S1104, the control device 62 provide the information display device 5 with the acquired analysis information via the communication device 63, and the operational flow terminates.

As described above in the embodiment, the information processing system 20 includes, for example, the generating unit 622, the position information acquisition device 55, and the provision unit 623. The generating unit 622 generates the spot information. In the spot information, the analysis information and the spot position information are associated with one another. The analysis information indicates the analysis result of the posting information posted on the SNS. The spot position information indicates the position of the spot identified based on the posting information. The position information acquisition device 55 acquires the position information. The position information acquisition device 55 is one example of position information acquisition unit. When having accepted the provision request for the analysis information, the provision unit 623 provides the analysis information included in the spot information that satisfies the predetermined conditions with respect to the position indicated by the position information.

The information processing system 20 may further include, for example, the analyzing unit 621 analyzing the posting information. The analyzing unit 621 may analyze the posting information to identify an emotional icon that corresponds to the analysis information as the analysis information. When having accepted the provision request for the analysis information, the provision unit 623 may provide the emotional icon that corresponds to the spot position information that satisfies the predetermined conditions with respect to the position indicated by the position information.

The information processing system 20 may further include the route search unit 513. The route search unit 513 searches for the route from the present location to the destination. The provision request includes the route information indicating the route. When having accepted the provision request for the posting information with respect to the spot information, the provision unit 623 provides the analysis information along the route.

The information processing system 20 may further include the storage device 64 and the image display device 57. The storage device 64 stores the map information. The image display device 57 displays the analysis information at the position indicated by the spot position information in a superimposed manner on the map.

Therefore, according to the embodiment, when the posting information is posted on the SNS, it is possible to cause the user to grasp the posting information by displaying the posting information on the spot where the posting is analyzed on the map. This enables to notify the user of the information on the content of the posting on the SNS with respect to the spot.

The above-described operational flow is an example, and the embodiment in not limited to the flow. When possible, the operational flow may be executed with the processing order changed, and may include additional processing separately, or some processing may be omitted.

In the machine learning of the embodiment, learning of a model may be performed with teacher data.

Each of the processing or each of the respective functions of the embodiment may be achieved by centralized processing by a single device or a single system or may be achieved by distributed processing by a plurality of devices or a plurality of systems. Each component of the embodiment may be configured by a dedicated hardware. For the components that are achievable by software, each component of the embodiment may be achieved by executing a program.

A part of or all of the system of the second embodiment may be combined with the system of the first embodiment. For example, the external server 8 and the terminal 9 of the second embodiment may be included in the search system of the first embodiment. The server 1 or the recommendation server 4 of the first embodiment may include a part of or all of the functions of the server device 6 of the second embodiment. The navigation device 3 of the first embodiment may includes a part of or all of the functions of the information display device 5 of the second embodiment.

The current position of the first embodiment corresponds to the present location of the second embodiment. The information on the spot of the first embodiment corresponds to the spot information of the second embodiment. For example, the information on the spot and the information on the recommendation spot of the first embodiment may include a part of or all of the information on the spot management information 10B shown in FIG. 21. The data server 2 of the first embodiment may include the information on the storage device 64 of the server device 6 of the second embodiment. The provision unit 623 of the second embodiment corresponds to the output unit of the first embodiment.

For example, the server 1 or the recommendation server 4 of the first embodiment may execute the processing shown in FIG. 22 before the processing shown in FIG. 16 and FIG. 17. In the processing at S108 in FIG. 16, the first transmission unit 14 of the server 1 may transmit the information on the spot including the analysis information or the information on the recommendation spot including the analysis information, which are transmitted from the recommendation server 4, to the navigation device 3. Namely, when having accepted the provision request for the analysis information, the first transmission unit 14 may transmit the analysis information that satisfies the predetermined conditions with respect to the position indicated by the position information to the navigation device 3. Then, the first display 39 of the navigation device 3 may display the analysis information.

Figure 25:
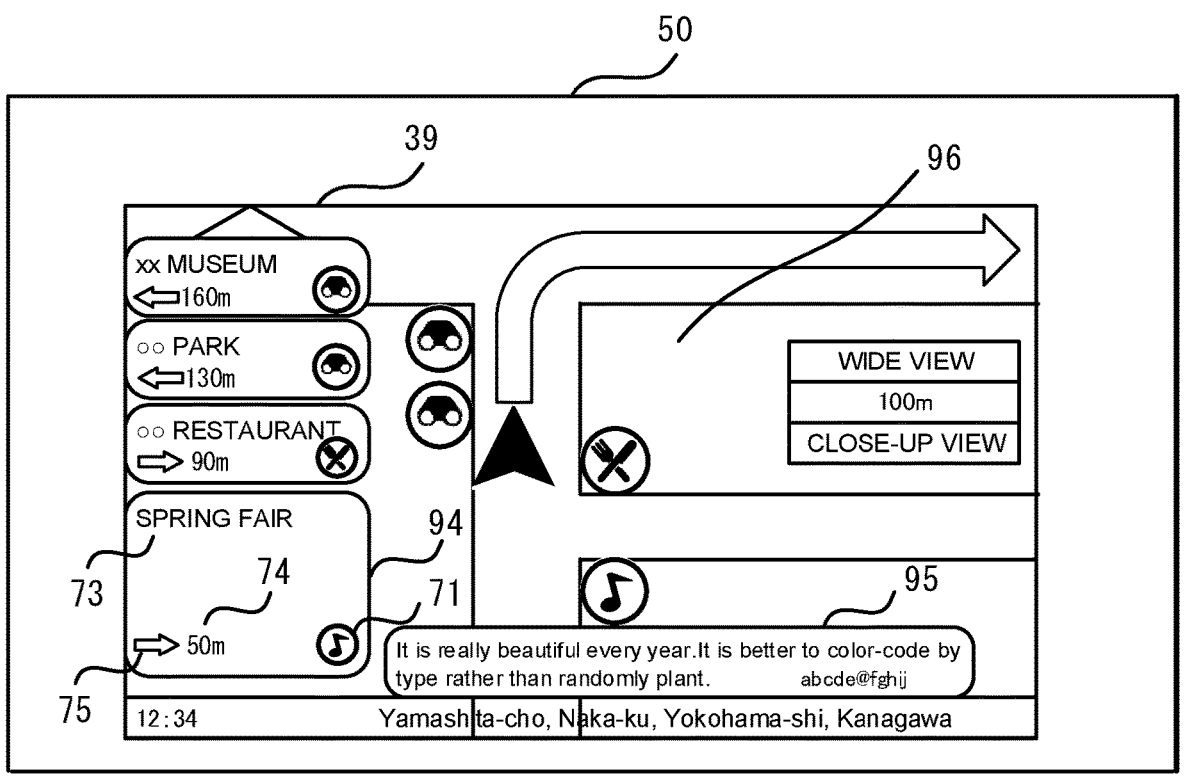
FIG. 25 is a drawing illustrating an example of displaying analysis information according to the second embodiment.

A description will be given of an example where the information display device 5 of the second embodiment is configured as the navigation device 3 of the first embodiment to display the analysis information with reference to FIG. 25. The first display 39 in FIG. 25 includes a display 96 regarding the navigation together with a spot information display 94. Namely, the first display 39 in FIG. 25 includes the function of the second display 40. The spot information display 94, similarly to FIG. 8, includes the icon 71, the spot name 73, the distance display 74, and the direction display 75. Furthermore, the first display 39 display analysis information 95 transmitted from the server 1. This enables providing a user with the information posted on the SNS.

Each of the processing or each of the respective functions of the above-described embodiment may be achieved by centralized processing by a single device or a single system or may be achieved by distributed processing by a plurality of devices or a plurality of systems. Each component of the above-described embodiment may be configured by a dedicated hardware. For the components that are achievable by software, each component of the above-described embodiment may be achieved by executing the program.

Each component of the above-described embodiment may be achieved by, for example, the CPU executing the program of the software recorded in the recording medium. The program may be executed by being downloaded from the server or may be executed by the program recorded in a predetermined recording medium being read out. A single computer or multiple computers may execute the program. The above-described embodiment may be configured to perform centralized processing or may be configured to perform distributed processing.

The embodiment shall not be limited to the above-mentioned embodiment and various modifications, additions, and omissions are applicable without departing from the spirit of the embodiment.

What is claimed is:

1. A search system comprising:
a navigation device configured to transmit a spot transmission request, a current position of a moving body and information on a route from the current position to a position of a destination to a first computer;
the first computer in communication with the navigation device; and
a data server including a second computer and storing information on spots,
wherein the first computer is configured to:
acquire the current position of the moving body and information on the route from the current position to the position of the destination from the navigation device, wherein the information on the route includes coordinates of a plurality of search starting points along the route and a number of the plurality of search starting points;
based on the information on the route acquired from the navigation device, determine a plurality of search ranges along the route, wherein widths of the plurality of search ranges are different, are respectively corresponding to distances from the plurality of search starting points along the route to the destination, and are dynamically changed along the route by narrowing in a first time zone and widening in a second time zone;
search for a spot present within each search range by transmitting a query including a search condition to the data server and receiving information on the spot present within the respective search range from the data server; and
output information on a searched spot to the navigation device, and
wherein the navigation device is configured to process and display the information on the searched spot, and perform a navigation to the searched spot.

2. The search system according to claim 1, wherein the search range becomes narrow as the distance from the current position becomes short.

3. The search system according to claim 1, wherein the search range becomes narrow as the distance from the current position becomes short in a region from the current position to a predetermined position, and becomes wide as the distance from the current position becomes short in a region from the predetermined position to the destination.

4. The search system according to claim 1, further comprising:
a third computer configured to extract a recommendation spot from the searched spot, based on a favorite spot for each user, the spot selected by the user, or the spot where the user has visited, wherein
the first computer is further configured to output the information on the recommendation spot.

5. The search system according to claim 1, wherein the first computer is further configured to remove a region beyond the destination from the search range.

6. The search system according to claim 1, wherein the first computer is further configured to limit an arrangement of the search range from an entrance of an expressway to an exit of the expressway, of the route.

7. The search system according to claim 1, wherein the first computer is further configured to dynamically change the width of the search range in accordance with an elapsed time.

8. The search system according to claim 1, wherein the first computer is further configured to generate spot information where analysis information and spot position information are associated with one another, the analysis information indicating an analysis result generated by analyzing posting information posted on a social networking service, the spot position information indicating a position of the spot, and output the analysis information that satisfies a predetermined condition with respect to the current position when having accepted a provision request for the analysis information.

9. A search method comprising:
transmit, by a navigation device, a spot transmission request, a current position of a moving body and information on a route from the current position to a position of a destination to a first computer;
acquiring, by the first computer, the current position of the moving body, and information on the route from the current position to the position of the destination from the navigation device, wherein the information on the route includes coordinates of a plurality of search starting points along the route and a number of the plurality of search starting points;
based on the information on the route acquired from the navigation device, determining, by the first computer, a plurality of search ranges along the route, wherein widths of the plurality of search ranges are different, are respectively corresponding to distances from the plurality of search starting points along the route to the destination, and are dynamically changed along the route by narrowing in a first time zone and widening in a second time zone
searching for, by the first computer, a spot present within each search range by transmitting a query including a search condition to a data server and receiving information on the spot present within the respective search range from the data server;
outputting information on a searched spot by the first computer to the navigation device; and
processing and displaying, by the navigation device the information on the searched spot, and performing a navigation to the searched spot.

10. A non-transitory computer-readable recording medium recording a search program for causing a computer to execute:
acquiring a current position of a moving body, and information on a route from the current position to a position of a destination from a navigation device, wherein the information on the route includes coordinates of a plurality of search starting points along the route and a number of the plurality of search starting points;
based on the information on the route acquired from the navigation device, determining a plurality of search ranges along the route, wherein widths of the plurality of search ranges are different, are respectively corresponding to distances from the plurality of search starting points along the route to the destination, and are dynamically changed along the route by narrowing in a first time zone and widening in a second time zone;
searching for a spot present within each search range by transmitting a query including a search condition to a data server and receiving information on the spot present within the respective search range from the data server; and
outputting information on a searched spot to the navigation device for processing and displaying the information on the search spot in the navigation device and for performing a navigation to the searched spot.

11. The search system according to claim 1, wherein the navigation device includes a processor, a first display executing display on navigation and displaying a map around the current position and the route, and a second display different from the first display and configure to list information on the searched spot transmitted from the first computer.

* * * * *